(12) United States Patent
Park et al.

(10) Patent No.: US 8,982,778 B2
(45) Date of Patent: Mar. 17, 2015

(54) PACKET ROUTING IN A WIRELESS COMMUNICATIONS ENVIRONMENT

(75) Inventors: Vincent D. Park, Budd Lake, NJ (US); M. Scott Corson, Gillette, NJ (US); George Tsirtsis, New York, NY (US)

(73) Assignee: QUALCOMM Incorporated, San Diego, CA (US)

(\*) Notice: Subject to any disclaimer, the term of this patent is extended or adjusted under 35 U.S.C. 154(b) by 1351 days.

(21) Appl. No.: 11/486,649

(22) Filed: Jul. 14, 2006

(65) Prior Publication Data

US 2007/0076653 A1 Apr. 5, 2007

Related U.S. Application Data

(60) Provisional application No. 60/718,363, filed on Sep. 19, 2005, provisional application No. 60/796,653, filed on May 1, 2006.

(51) Int. Cl.
*H04W 4/00* (2009.01)
*H04L 12/725* (2013.01)
(Continued)

(52) U.S. Cl.
CPC .......... *H04L 45/302* (2013.01); *H04L 12/4633* (2013.01); *H04L 45/306* (2013.01); *H04W 40/12* (2013.01); *H04W 80/00* (2013.01); *H04W 84/042* (2013.01)
USPC ........... 370/328; 370/400; 370/338; 370/401; 370/466

(58) Field of Classification Search
CPC ....... H04L 45/00; H04L 47/10; H04L 49/351; H04L 29/0653; H04L 49/3009; H04L 29/06; H04L 45/02; H04L 45/306; H04L 12/4633; H04L 45/302; H04W 40/12; H04W 80/00; H04W 84/042

USPC ......... 370/312, 328, 389, 392, 400, 338, 401, 370/466

See application file for complete search history.

(56) References Cited

U.S. PATENT DOCUMENTS

| | | |
|---|---|---|
| 4,833,701 A | 5/1989 | Comroe et al. |
| 5,117,502 A | 5/1992 | Onoda et al. |

(Continued)

FOREIGN PATENT DOCUMENTS

| | | |
|---|---|---|
| AU | 2002353616 | 5/2003 |
| CN | 1043052 A | 6/1990 |

(Continued)

OTHER PUBLICATIONS

Leon-Grcia, Alberto; "Communication Networks: Fundamental Concepts and Key Architectures"; Jul. 16, 2003; McGraw-Hill; 2nd Edition; pp. 44-52, 429-431.*

(Continued)

*Primary Examiner* — Ajit Patel
(74) *Attorney, Agent, or Firm* — Anthony R. Morris

(57) ABSTRACT

The claimed subject matter relates to performing routing in a wireless communications system. In more detail, each device associated with a wireless packet-switched network may not be aware of an identity and/or address of a particular point of attachment with respect to a wireless terminal. A data packet that should be provided to a particular point of attachment can be initially directed to a wireless terminal or a one-hop multicast address, for instance. Thereafter, the data packet can be encapsulated in a frame format and identity of the particular point of attachment can be provided in such frame. The frame can thereafter be routed to the point of attachment.

21 Claims, 27 Drawing Sheets

(51) Int. Cl.
*H04L 12/46* (2006.01)
*H04W 40/12* (2009.01)
*H04W 80/00* (2009.01)
*H04W 84/04* (2009.01)

(56) References Cited

U.S. PATENT DOCUMENTS

| | | | |
|---|---|---|---|
| 5,128,938 A | 7/1992 | Borras | |
| 5,200,952 A | 4/1993 | Bernstein et al. | |
| 5,208,837 A | 5/1993 | Richey | |
| 5,229,992 A | 7/1993 | Jurkevich et al. | |
| 5,247,516 A | 9/1993 | Bernstein et al. | |
| 5,251,209 A | 10/1993 | Jurkevich et al. | |
| 5,267,261 A | 11/1993 | Blakeney, II et al. | |
| 5,268,933 A | 12/1993 | Averbuch | |
| 5,388,102 A | 2/1995 | Griffith et al. | |
| 5,490,139 A * | 2/1996 | Baker et al. | 370/312 |
| 5,491,835 A | 2/1996 | Sasuta et al. | |
| 5,509,027 A | 4/1996 | Vook et al. | |
| 5,539,925 A | 7/1996 | Yli-Kotila et al. | |
| 5,561,841 A | 10/1996 | Markus | |
| 5,572,528 A | 11/1996 | Shuen | |
| 5,574,720 A | 11/1996 | Lee | |
| 5,594,943 A | 1/1997 | Balachandran | |
| 5,694,548 A | 12/1997 | Baugher et al. | |
| 5,722,044 A | 2/1998 | Padovani et al. | |
| 5,737,328 A * | 4/1998 | Norman et al. | 370/331 |
| 5,794,137 A | 8/1998 | Harte | |
| 5,854,785 A | 12/1998 | Willey | |
| 5,870,427 A | 2/1999 | Tiedemann et al. | |
| 5,974,036 A | 10/1999 | Acharya et al. | |
| 5,978,366 A | 11/1999 | Massingill et al. | |
| 6,016,316 A | 1/2000 | Moura et al. | |
| 6,018,521 A | 1/2000 | Timbs et al. | |
| 6,031,863 A | 2/2000 | Jusa et al. | |
| 6,034,950 A | 3/2000 | Sauer et al. | |
| 6,049,543 A | 4/2000 | Sauer et al. | |
| 6,055,428 A | 4/2000 | Soliman | |
| 6,073,021 A | 6/2000 | Kumar et al. | |
| 6,084,969 A | 7/2000 | Wright et al. | |
| 6,094,427 A | 7/2000 | Yi | |
| 6,097,952 A | 8/2000 | Kawabata | |
| 6,101,394 A | 8/2000 | Illidge | |
| 6,137,787 A | 10/2000 | Chawla et al. | |
| 6,144,671 A | 11/2000 | Perinpanathan et al. | |
| 6,151,502 A | 11/2000 | Padovani et al. | |
| 6,157,668 A | 12/2000 | Gilhousen et al. | |
| 6,157,833 A | 12/2000 | Lawson-Jenkins et al. | |
| 6,157,978 A | 12/2000 | Ng et al. | |
| 6,161,008 A | 12/2000 | Lee et al. | |
| 6,163,692 A | 12/2000 | Chakrabarti et al. | |
| 6,195,552 B1 | 2/2001 | Jeong et al. | |
| 6,195,705 B1 | 2/2001 | Leung | |
| 6,201,971 B1 | 3/2001 | Purnadi et al. | |
| 6,256,300 B1 | 7/2001 | Ahmed et al. | |
| 6,272,129 B1 | 8/2001 | Dynarski et al. | |
| 6,285,665 B1 | 9/2001 | Chuah | |
| 6,300,887 B1 | 10/2001 | Le | |
| 6,308,267 B1 | 10/2001 | Gremmelmaier | |
| 6,345,043 B1 | 2/2002 | Hsu | |
| 6,347,091 B1 | 2/2002 | Wallentin et al. | |
| 6,360,100 B1 | 3/2002 | Grob et al. | |
| 6,366,561 B1 | 4/2002 | Bender | |
| 6,370,380 B1 | 4/2002 | Norefors et al. | |
| 6,397,065 B1 | 5/2002 | Huusko et al. | |
| 6,400,722 B1 | 6/2002 | Chuah et al. | |
| 6,445,922 B1 | 9/2002 | Hiller et al. | |
| 6,446,127 B1 | 9/2002 | Schuster et al. | |
| 6,449,481 B1 | 9/2002 | Kwon et al. | |
| 6,456,604 B1 | 9/2002 | Lee et al. | |
| 6,466,964 B1 | 10/2002 | Leung et al. | |
| 6,473,418 B1 | 10/2002 | Laroia et al. | |
| 6,493,725 B1 | 12/2002 | Iwai et al. | |
| 6,496,704 B2 | 12/2002 | Yuan | |
| 6,510,153 B1 | 1/2003 | Inoue et al. | |
| 6,516,352 B1 | 2/2003 | Booth et al. | |
| 6,519,457 B1 | 2/2003 | Jiang et al. | |
| 6,529,732 B1 | 3/2003 | Vainiomaki et al. | |
| 6,535,493 B1 | 3/2003 | Lee et al. | |
| 6,535,739 B1 | 3/2003 | Chen et al. | |
| 6,553,227 B1 | 4/2003 | Ho et al. | |
| 6,587,680 B1 | 7/2003 | Ala-Laurila et al. | |
| 6,611,547 B1 | 8/2003 | Rauhala | |
| 6,640,248 B1 | 10/2003 | Jorgensen | |
| 6,654,363 B1 | 11/2003 | Li et al. | |
| 6,671,512 B2 | 12/2003 | Laakso | |
| 6,701,155 B2 | 3/2004 | Sarkkinen et al. | |
| 6,708,031 B2 | 3/2004 | Purnadi et al. | |
| 6,714,524 B1 | 3/2004 | Kim et al. | |
| 6,714,777 B1 | 3/2004 | Naqvi et al. | |
| 6,714,788 B1 | 3/2004 | Voyer | |
| 6,728,365 B1 | 4/2004 | Li et al. | |
| 6,754,492 B1 | 6/2004 | Stammers et al. | |
| 6,763,007 B1 | 7/2004 | La Porta et al. | |
| 6,768,908 B1 | 7/2004 | Jalloul et al. | |
| 6,771,962 B2 | 8/2004 | Saifullah et al. | |
| 6,785,256 B2 | 8/2004 | O'Neill | |
| 6,807,421 B1 | 10/2004 | Ahmavaara | |
| 6,842,621 B2 | 1/2005 | Labun et al. | |
| 6,842,630 B2 | 1/2005 | Periyalwar | |
| 6,862,446 B2 | 3/2005 | O'Neill et al. | |
| 6,901,063 B2 | 5/2005 | Vayanos et al. | |
| 6,917,605 B2 | 7/2005 | Kakemizu et al. | |
| 6,937,566 B1 | 8/2005 | Forslow | |
| 6,947,401 B2 | 9/2005 | El-Malki et al. | |
| 6,950,650 B2 | 9/2005 | Roeder | |
| 6,954,442 B2 | 10/2005 | Tsirtsis et al. | |
| 6,961,579 B2 | 11/2005 | Inukai et al. | |
| 6,965,585 B2 | 11/2005 | Grilli et al. | |
| 6,970,445 B2 | 11/2005 | O'Neill et al. | |
| 6,990,088 B2 | 1/2006 | Madour | |
| 6,990,337 B2 | 1/2006 | O'Neill et al. | |
| 6,990,339 B2 | 1/2006 | Turanyi et al. | |
| 6,990,343 B2 | 1/2006 | Lefkowitz | |
| 6,992,994 B2 | 1/2006 | Das et al. | |
| 6,993,332 B2 | 1/2006 | Pedersen et al. | |
| 7,003,311 B2 | 2/2006 | Ebata et al. | |
| 7,006,826 B2 | 2/2006 | Cao et al. | |
| 7,016,317 B1 | 3/2006 | Pathak et al. | |
| 7,027,400 B2 | 4/2006 | O'Neill | |
| 7,027,449 B2 | 4/2006 | Garcia-Luna-Aceves et al. | |
| 7,047,009 B2 | 5/2006 | Laroia et al. | |
| 7,068,640 B2 | 6/2006 | Kakemizu et al. | |
| 7,068,654 B1 | 6/2006 | Joseph et al. | |
| 7,069,040 B2 | 6/2006 | Iwanaga et al. | |
| 7,079,511 B2 | 7/2006 | Abrol et al. | |
| 7,089,008 B1 | 8/2006 | Back et al. | |
| 7,116,654 B2 | 10/2006 | Kim | |
| 7,123,599 B2 | 10/2006 | Yano et al. | |
| 7,130,291 B1 | 10/2006 | Kim et al. | |
| 7,155,236 B2 | 12/2006 | Chen et al. | |
| 7,161,913 B2 | 1/2007 | Jung | |
| 7,167,447 B2 | 1/2007 | Puuskari et al. | |
| 7,177,641 B1 | 2/2007 | Miernik et al. | |
| 7,184,771 B1 | 2/2007 | Mouly et al. | |
| 7,197,318 B2 | 3/2007 | Schwarz et al. | |
| 7,233,583 B2 | 6/2007 | Asthana et al. | |
| 7,233,794 B2 | 6/2007 | Grob et al. | |
| 7,263,357 B2 | 8/2007 | Lee et al. | |
| 7,266,100 B2 | 9/2007 | Le et al. | |
| 7,272,122 B2 | 9/2007 | Trossen et al. | |
| 7,283,495 B2 | 10/2007 | Lee et al. | |
| 7,283,511 B2 | 10/2007 | Hans et al. | |
| 7,290,063 B2 | 10/2007 | Kalliokulju et al. | |
| 7,315,554 B2 | 1/2008 | Baum et al. | |
| 7,330,542 B2 | 2/2008 | Kauhanen et al. | |
| 7,336,953 B2 | 2/2008 | Kim et al. | |
| 7,369,855 B2 | 5/2008 | ONeill et al. | |
| 7,369,859 B2 | 5/2008 | Gallagher | |
| 7,376,101 B2 | 5/2008 | Shim et al. | |
| 7,389,110 B2 | 6/2008 | Lee | |
| 7,391,741 B2 | 6/2008 | Kang | |
| 7,403,789 B2 | 7/2008 | Takano et al. | |
| 7,408,917 B1 | 8/2008 | Kyung et al. | |

(56) References Cited

U.S. PATENT DOCUMENTS

| | | |
|---|---|---|
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,525,940 B2 | 4/2009 | Trossen et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | O'Neill et al. |
| 7,672,254 B2 | 3/2010 | Kim et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |
| 7,773,947 B2 | 8/2010 | Gerlach |
| 7,962,142 B2 | 6/2011 | O'Neill et al. |
| 8,112,102 B2 | 2/2012 | Fischer |
| 8,134,976 B2 | 3/2012 | Wallace et al. |
| 8,144,664 B2 | 3/2012 | Pani et al. |
| 8,165,587 B2 | 4/2012 | Dahlen et al. |
| 8,184,615 B2 | 5/2012 | Tsirtsis et al. |
| 8,229,120 B2 | 7/2012 | Iwamura et al. |
| 8,509,799 B2 | 8/2013 | Park et al. |
| 8,583,044 B2 | 11/2013 | Dua |
| 8,588,777 B2 | 11/2013 | Grob et al. |
| 8,615,241 B2 | 12/2013 | Gupta et al. |
| 8,830,818 B2 | 9/2014 | Damnjanovic |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0114308 A1 | 8/2002 | Takano et al. |
| 2002/0126701 A1 | 9/2002 | Requena et al. |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0009582 A1 | 1/2003 | Qiao et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0101307 A1 | 5/2003 | Gemelli et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0119516 A1 | 6/2003 | Tomishima et al. |
| 2003/0204599 A1 | 10/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2003/0236103 A1 | 12/2003 | Tamaki et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008630 A1 | 1/2004 | Corson et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1* | 6/2004 | Forssell ............... 370/394 |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0192390 A1 | 9/2004 | Tajima |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0020262 A1 | 1/2005 | Kim |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0090260 A1 | 4/2005 | Semper |
| 2005/0128949 A1 | 6/2005 | Ku et al. |
| 2005/0128990 A1 | 6/2005 | Eom et al. |
| 2005/0141468 A1 | 6/2005 | Kim et al. |
| 2005/0143072 A1 | 6/2005 | Yoon et al. |
| 2005/0201324 A1 | 9/2005 | Zheng |
| 2005/0265303 A1* | 12/2005 | Edwards et al. ............... 370/349 |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum, Jr. et al. |
| 2006/0029028 A1 | 2/2006 | Kim et al. |
| 2006/0056348 A1 | 3/2006 | Marinier et al. |
| 2006/0067526 A1 | 3/2006 | Faccin et al. |
| 2006/0069809 A1 | 3/2006 | Serlet |
| 2006/0089141 A1 | 4/2006 | Ho et al. |
| 2006/0099948 A1 | 5/2006 | Hoghooghi et al. |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0183479 A1 | 8/2006 | Liu et al. |
| 2006/0217119 A1 | 9/2006 | Bosch et al. |
| 2006/0221883 A1 | 10/2006 | Damnjanovic et al. |
| 2006/0230019 A1 | 10/2006 | Hill et al. |
| 2006/0268924 A1* | 11/2006 | Marinier et al. ............... 370/445 |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1 | 5/2007 | Kim |
| 2007/0105555 A1 | 5/2007 | Miernik et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0149126 A1 | 6/2007 | Rangan et al. |
| 2007/0149194 A1 | 6/2007 | Das et al. |
| 2007/0171875 A1 | 7/2007 | Suda |
| 2007/0189282 A1 | 8/2007 | Lohr et al. |

(56) References Cited

U.S. PATENT DOCUMENTS

| | | |
|---|---|---|
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0019293 A1 | 1/2008 | Chang et al. |
| 2008/0031198 A1 | 2/2008 | Hwang et al. |
| 2008/0051091 A1 | 2/2008 | Phan et al. |
| 2008/0074994 A1 | 3/2008 | Jen |
| 2008/0076424 A1 | 3/2008 | Barber et al. |
| 2008/0089287 A1 | 4/2008 | Sagfors et al. |
| 2008/0146231 A1 | 6/2008 | Huang et al. |
| 2008/0160999 A1 | 7/2008 | Eklund |
| 2008/0240039 A1 | 10/2008 | Parekh et al. |
| 2008/0242292 A1 | 10/2008 | Koskela et al. |
| 2008/0253332 A1 | 10/2008 | Ore et al. |
| 2008/0259855 A1 | 10/2008 | Yoon et al. |
| 2008/0261600 A1 | 10/2008 | Somasundaram et al. |
| 2009/0029706 A1 | 1/2009 | Prakash et al. |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1 | 7/2009 | Venkitaraman |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2010/0080126 A1* | 4/2010 | Higashida ............... 370/235 |
| 2011/0019614 A1 | 1/2011 | ONeill et al. |
| 2011/0039546 A1 | 2/2011 | Narasimha et al. |
| 2011/0039552 A1 | 2/2011 | Narasimha et al. |
| 2011/0051660 A1 | 3/2011 | Arora et al. |
| 2011/0103347 A1 | 5/2011 | Dimou |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |
| 2013/0294324 A1 | 11/2013 | Corson et al. |

FOREIGN PATENT DOCUMENTS

| | | | |
|---|---|---|---|
| CN | 1344477 | A | 4/2002 |
| CN | 1345518 | A | 4/2002 |
| CN | 1416284 | A | 5/2003 |
| CN | 1481119 | A | 3/2004 |
| CN | 1514607 | | 7/2004 |
| CN | 1859529 | A | 11/2006 |
| EP | 0740440 | A2 | 10/1996 |
| EP | 0813346 | A1 | 12/1997 |
| EP | 0974895 | A2 | 1/2000 |
| EP | 1088463 | A1 | 4/2001 |
| EP | 1128704 | A1 | 8/2001 |
| EP | 1345370 | A2 | 9/2003 |
| EP | 0926608 | B1 | 3/2004 |
| EP | 1458209 | A2 | 9/2004 |
| EP | 1473872 | A2 | 11/2004 |
| EP | 1489808 | A2 | 12/2004 |
| EP | 1507421 | A1 | 2/2005 |
| EP | 1565024 | A2 | 8/2005 |
| EP | 1720267 | A1 | 11/2006 |
| EP | 1764942 | A2 | 3/2007 |
| GB | 2322046 | | 8/1998 |
| GB | 2395629 | A | 5/2004 |
| JP | 2084807 | | 3/1990 |
| JP | 08116329 | | 5/1996 |
| JP | 11308273 | | 11/1999 |
| JP | H11341541 | A | 12/1999 |
| JP | 2000125343 | A | 4/2000 |
| JP | 2001217830 | A | 8/2001 |
| JP | 2001237878 | A | 8/2001 |
| JP | 2001245355 | A | 9/2001 |
| JP | 2002111732 | A | 4/2002 |
| JP | 2002165249 | A | 6/2002 |
| JP | 2002281069 | A | 9/2002 |
| JP | 2002281539 | A | 9/2002 |
| JP | 2002537739 | | 11/2002 |
| JP | 2003060685 | A | 2/2003 |
| JP | 2003111134 | A | 4/2003 |
| JP | 2003348007 | | 5/2003 |
| JP | 2003304571 | A | 10/2003 |
| JP | 2003338833 | A | 11/2003 |
| JP | 2004007578 | A | 1/2004 |
| JP | 2004104544 | A | 4/2004 |
| JP | 2004147228 | | 5/2004 |
| JP | 2004187256 | | 7/2004 |
| JP | 2004201289 | A | 7/2004 |
| JP | 2004297130 | A | 10/2004 |
| JP | 2004328637 | A | 11/2004 |
| JP | 2005531173 | T | 10/2005 |
| JP | 2007527177 | T | 9/2007 |
| JP | 2008053889 | A | 3/2008 |
| JP | 4827994 | B1 | 11/2011 |
| KR | 20040004918 | A | 1/2004 |
| KR | 20040105069 | A | 12/2004 |
| KR | 20050023194 | A | 3/2005 |
| KR | 20050065123 | | 6/2005 |
| KR | 20050066287 | A | 6/2005 |
| KR | 20070031810 | A | 3/2007 |
| RU | 2117396 | C1 | 8/1998 |
| RU | 2256299 | C2 | 7/2005 |
| RU | 2292669 | | 1/2007 |
| RU | 2294596 | C2 | 2/2007 |
| TW | 200527930 | | 8/2005 |
| WO | 9501706 | A1 | 1/1995 |
| WO | 9804094 | A1 | 1/1998 |
| WO | 9833288 | | 7/1998 |
| WO | 9847302 | | 10/1998 |
| WO | 9856140 | A2 | 12/1998 |
| WO | 9905828 | A1 | 2/1999 |
| WO | 9927718 | | 6/1999 |
| WO | 9966748 | A1 | 12/1999 |
| WO | 0041426 | A1 | 7/2000 |
| WO | 0128160 | A2 | 4/2001 |
| WO | 0158196 | A1 | 8/2001 |
| WO | 0163947 | A | 8/2001 |
| WO | 0219746 | A1 | 3/2002 |
| WO | 0243409 | A2 | 5/2002 |
| WO | 02056551 | A1 | 7/2002 |
| WO | 03007484 | A2 | 1/2003 |
| WO | 03017582 | | 2/2003 |
| WO | 03092316 | A1 | 11/2003 |
| WO | 03096657 | A2 | 11/2003 |
| WO | 03098816 | A2 | 11/2003 |
| WO | 03105516 | A1 | 12/2003 |
| WO | 2004068739 | A1 | 8/2004 |
| WO | 2004079949 | A1 | 9/2004 |
| WO | 2004105272 | A1 | 12/2004 |
| WO | 2004107638 | A2 | 12/2004 |
| WO | 2004114695 | A1 | 12/2004 |
| WO | 2005011231 | A2 | 2/2005 |
| WO | 2005048629 | A1 | 5/2005 |
| WO | 2005078966 | A1 | 8/2005 |
| WO | 2005084146 | A2 | 9/2005 |
| WO | 2005120183 | A2 | 12/2005 |
| WO | 2006002676 | A1 | 1/2006 |
| WO | 2006083131 | A1 | 8/2006 |
| WO | 2006105308 | A2 | 10/2006 |
| WO | 2007073487 | A2 | 6/2007 |
| WO | 2007075671 | | 7/2007 |
| WO | 2007075736 | A2 | 7/2007 |
| WO | 2007075955 | A1 | 7/2007 |
| WO | 2008113373 | A1 | 9/2008 |
| WO | 2008131401 | A1 | 10/2008 |

OTHER PUBLICATIONS

Miorandi D. et al.: "Analysis of master-slave protocols for real-time industrial communications over IEEE 802.11 WLANs" Industrial Infomatics, 2004,k Indin '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.

3GPP, "3rd Generation Partnership Project, Technical Specification Group Radio Access Network, E-UTRAN Mobility Evaluation and Enhancement,(Release 9)", 3GPP Draft, R1-090856 TP for TR for

(56) References Cited

OTHER PUBLICATIONS

Mobility Studies, 3rd Generation Partnership Project (3GPP), Mobile Competence Centre, 650, Route des Lucioles, F-06921 Sophia-Antipolis Cedex, France, no. Athens, Greece, Feb. 3, 2009, 16 pgs., XP050318707.

3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)", version 0.0.1, Release 8, year 2007, pp. 9.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9 ) , 3GPP Standard; 3GPP TS 36.300, 3rd Generation Partnership Project (3GPP), Mobile Competence Centre ; 650, Route des Lucioles ; F-06921 Sophia-Antipolis Cedex ; France, No. V9.2.0, Jan. 7, 2010, pp. 1-178, XP050401821, [retrieved on Jan. 7, 2010.

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Parnership Project (3GPP), Mobile Competence Centre; 650, Route des Lucioles ; F-06921 Sophia-Antipolis Cedex; France, No. V8.2.0, May 1, 2008, pp. 1-151, XP050377645.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822, [retrieved on Jan. 7, 2010].

Baker, F., IETF, "RSVP Management Information Base Using SMIv2," Network Working Group, Request for Comments: 2206, pp. 1-64 (Sep. 1997).

Basic Knowledge of Communications Term of Switching Hub, Nov. 9. 2006, 2 pgs.

Berger, L., et al., "RSVP Extensions for IPSEC Data Flows," IETF, Network Working Group, Request for Comments: 2207, pp. 1-14 (Sep. 1997).

Berger, L., "RSVP Refresh Overhead Reduction Extensions," IETF Network Working Group, Request for Comments: 2961, pp. 1-34 (Apr. 2001).

Bos et al., "A Framework for End-to-End Perceived Quality of Service Negotiation", IETF Internal Draft, draft-bos-mmusic-sdpgos-framework-00.txt, Nov. 2001, pp. 1-22.

Braden, R., "Resource ReSerVation Protocol (RSVP)—Ver. 1, Message Processing Rules," IETF, Network Working Group, Request for Comments: 2209, pp. 1-25 (Sep. 1997).

Braden, R., "Resource ReSerVation Protocol (RSVP)—Ver. 1 Functional Specification". IETF, Network Working Group, Request for Comments: 2205, pp. 1-112 (Sep. 1997).

Camarillo, G., et al., "Integration of Resource Management and SIP," IETF Internet Draft, draft-ietf-sip-manyfolks-resource-04.ps, Feb. 25, 2002, pp. 1-18.

Campbell, Andrew T. et al., "IP Micro-Mobility Protocols", Mobile Computing and Communications Review (MC2R), vol. 4, No. 4, pp. 45-53, (Oct. 2001).

Co-pending U.S. Appl. No. 08/144,901, filed Oct. 28, 1993.

Droms, R.: "Dynamic Host Configuration Protocol," IETF Standard, RFC 2131, Internet Engineering Task Force, IETF, Ch, pp. 1-45, (Mar. 1997) XP015007915.

Etri, "Source Specific Multicast (SSM) Explicit Multicast (Xcast)" pp. 1-27 (Jun. 28, 2001).

European Search Report—EP10153235—Search Authority—Munich—Mar. 25, 2010.

Ho, Michael. "Integration AAA with Mobile IPv4", Internet Draft, pp. 1-59, Apr. 2002.

Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre ; 650, Route Des Lucioles ; F-06921 Sophia-Antipolis Cedex ; France, vol. RAN WG2, No. San Francisco, USA; Feb. 22, 2010, Mar. 4, 2010, XP050422194, 3 pgs. [retrieved on Mar. 4, 2010].

Ian F.A., et al., "Mobility Management in Next-Generation Wireless Systems", Proceedings of the IEEE, IEEE. New York, us, vol. 87, No. 8, Aug. 1, 1999, XP011044241, ISSN: 0018-9219, pp. 1347-1384.

International Search Report and Written Opinion—PCT/US2006/036584, International Search Authority—European Patent Office—Mar. 2, 2007.

Johnson, D., et al., IETF Mobile IP Working Group, "Mobility Support in IPv6," ; Feb. 26, 2003 Downloaded From http://www.join.uni-muenster.de on Dec. 29, 2004, pp. 1-169.

Karagiannis, Georgios. "Mobile IP: State of the Art Report," Ericsson, No. 3/0362-FCP NB 102 88 UEN, pp. 1-63, (Jul. 13, 1999).

Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph-p. 3, left-hand column, paragraph 3 p. 5, right-hand column, last paragraph-p. 7, right-hand column, last paragraph.

Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.

Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.

Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).

Marshall, W. et al. "Integration of Resource Management and SIP: SIP Extensions for Resource Management," IETF Internet Draft, draft-ietf-sip-manyfolks-resource-02.txt, Aug. 2001, pp. 1-28.

Mockapetris P., "Domain Names—Implentation and Specification", IETF RFC 1035, Nov. 1987.

Moy, J., "OSPF Version 2", Network Working Group, Request for Comments: 2328, pp. 1-244 (Apr. 1998).

"Network Layer Protocol," Jul. 13, 2002, chap. 6, pp. 1-35, URL: http://www2.yamanashi-ken.ac.jp/~itoyo/lecture/network/network06/index06.htm.

Nortel: "Forward Hand-Off options", R2-071980, 3GPP TSG-RAN WG2 Meeting #58, Kobe, Japan, May 7-11, 2007, sections 2-3.

Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. RAN WG2, No. Tallinn, 20060823, Aug. 23, 2006, XP050131764.

Papalilo, D. et al. "Extending SIP for QoS Support", www.coritel.it/publications/IP_download/papalilo-salsano-veltri.pdf, Dec. 8, 2001, pp. 1-6.

Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.

Perkins, C., "IP Mobility Support", IBM, Network Working Group, Request for Comments: 2002, pp. 1-79 (Oct. 1996).

Pollini, G P et al., "Trends in Handover Design" IEEE 34(3), pp. 82-90, Mar. 1, 1996, XP00557380.

Rosenberg J et al:RFAC 3261: "SIP: Session Initiation Protocol" Jun. 1, 2002, pp. 1-269, XP015009039.

Schulzrinne et al., "Application-Layer Mobility Using SIP", 0-7803-7133 IEEE, pp. 29-36, Jan. 2000.

Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129-134.

(56) References Cited

OTHER PUBLICATIONS

"Terms for Use in Textbooks and Lectures on Distributed Computing," Feb. 13, 2005, URL: http://web.archive.org/web/20050213090736/http://www.nuis.ac.jp/~nagai/lecture/dce.html.

Thulasi, A., et al., "IPv6 Prefix Delegation Using ICMPv6", Network Working Group, Hewlett-Packard, pp. 1-34, Apr. 2004.

TIA/EIA/IS-707A.8 "Data Service Options for Spread Spectrum Systems: Radio Link Protocol Type 2" pp. 1-1:4:12 (Mar. 1999).

Trossen, D. et al., "A Dynamic Protocol for Candidate Access-Router Discovery", 35 pgs., Mar. 14, 2003.

Valko, A.G. et al.: "Cellular IP: A New Approach to Internet Host Mobility" Computer Communication Review, Association for Computing Machinery. New York, US vol. 29, No. 1, Jan. 1999, pp. 50-65, XP000823873 ISSN: 0146-4833, p. 56, Line 7-Line 13.

Wedlund et al: "Mobility Support Using SIP", Proc. of ACM/IEEE International Conference on Wireless and Mobile Multimedia (WoWMoM '99), Seattle, Washington, Aug. 1999.

Wroclawski, J., "The Use of RSVP with IETF Integrated Services," IETF, Network Working Group, Request for Comments: 2210, pp. 1-33 (Sep. 1997).

Zhou, S., et al., "A Location Management Scheme for Mobility Support in Wireless IP Networks Using Session Initiation Protocol (SIP)", 1531-2216/01 IEEE, pp. 486-491, Oct. 2001.

Zte, et al., "Handover Cause Report for Mobility Robustness Optimization", 3GPP Draft; R3-092982, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050392455, 4 pgs. [retrieved on Nov. 19, 2009].

\* cited by examiner

ND APPARATUS FOR THE UTILIZATION OF MOBILE NODES FOR STATE TRANSFER AS PART OF A HANDOFF OPERATION"; and U.S. Provisional Patent Application Ser. No. 60/796,653, filed on May 1, 2006, and entitled "A METHOD AND APPARATUS FOR MOBILITY AWARE RESOURCE CONTROL" (Park). This application is also related to U.S. patent application Ser. No. 11/288,597, filed Nov. 29, 2005, and entitled "METHODS AND APPARATUS FOR THE UTILIZATION OF MOBILE NODES FOR STATE TRANSFER"; U.S. patent application Ser. No. 11/316,602, filed Dec. 22, 2005, and entitled "COMMUNICATIONS METHODS AND APPARATUS USING PHYSICAL ATTACHMENT POINT IDENTIFIERS"; U.S. patent application Ser. No. 11/316,376, filed Dec. 22, 2005, and entitled "COMMUNICATIONS METHODS AND APPARATUS USING PHYSICAL ATTACHMENT POINT IDENTIFIERS WHICH SUPPORT DUAL COMMUNICATIONS LINK"; U.S. patent application Ser. No. 11/316,603, filed Dec. 22, 2005, and entitled "METHOD AND APPARATUS FOR END NODE ASSISTED NEIGHBOR DISCOVER"; and U.S. Pat. No. 6,862,446, filed Feb. 18, 2003, and entitled "METHODS AND APPARATUS FOR THE UTILIZATION OF CORE BASED NODES FOR STATE TRANSFER." This application is additionally related to the following co-filed patent applications: Ser. No. 11/487,446, entitled "PROVISION OF A MOVE INDICATION TO A RESOURCE REQUESTER" (Park, et al.); Ser. No. 11/486,654, entitled "PROVISION OF QOS TREATMENT BASED UPON MULTIPLE REQUESTS" (Park, et al.); Ser. No. 11/486,650, entitled "STATE SYNCHRONIZATION BETWEEN ACCESS ROUTERS" (Tsirtsis, et al.); and Ser. No. 11/486,655, entitled "STATE SYNCHRONIZATION BETWEEN ACCESS ROUTERS" (Tsirtsis, et al.). The entireties of each of the aforementioned applications and patent are incorporated herein by reference.

BACKGROUND

I. Field

The invention relates generally to communications systems, and more particularly to providing refined quality of service with respect to one or more traffic flows associated with a terminal.

II. Background

Communication networks, such as wireless communication networks, broadband networks, and any other suitable networks are utilized in connection with transferring data, wherein data can include word processing files, streaming video, multimedia files, voice data, and/or the like. Providing appropriate quality of service (QoS) to certain subscribers can be important for retaining customer satisfaction as well as optimizing resources associated with one or more network links. In wireless networks, however, providing appropriate QoS can be difficult, as QoS support must be considered in connection with units that are transitioning between different access nodes (e.g., base stations, access routers, or access points). Thus, providing appropriate QoS treatment to a wireless terminal is a nontrivial case.

In a typical wireless communications network, a set of geographically dispersed access nodes (e.g., base stations) provide wireless access to a communications infrastructure for a plurality of end nodes (e.g., wireless terminals). Cellular network systems have traditionally been primarily based on circuit-switch technology, but a variety of emerging cellular network systems are more heavily based on packet-switched technology (e.g., the Internet Protocol (IP) suite). In such networks, flexible QoS differentiation mechanisms are needed to effectively support a variety of different applications (e.g., telephony, text messaging, streaming audio/video, web browsing, file transfer, . . . ). QoS mechanisms designed primarily for use in fixed, hard-wired, packet-switched network infrastructures are not well suited for use in a cellular network. In particular, aspects such as mobility of subscriber access devices, the potentially constrained nature of a wireless access link, and differences in network architecture impede or preclude use of existing resource control protocols in wireless packet-switched networks.

In connection with requesting QoS support with respect to a particular subscriber, conventional networks utilize a centralized entity or a subscriber with respect to such requests. For instance, if a subscriber needs certain QoS support, such subscriber requests such support from a provider of QoS support. These conventional methods for requesting and receiving QoS support are inflexible and inefficient.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to routing of packets in a wireless communications environment. For example, a data packet can be received, wherein such data packet should be provided to a particular point of attachment from amongst a plurality of points of attachment with respect to a wireless terminal. A creator of such packet may not be aware of an identity or address of the particular point of attachment, however, and can accordingly direct the data packet to a disparate entity or address, such as a one-hop multicast address, a home agent, and/or the like. The data packet can then be encapsulated by, for instance, a wireless terminal or a home agent, within an LLC frame, and within the frame an identity of the particular point of attachment can be included. The LLC can then be routed to the primary point of attachment.

For example, a host device may only be aware of a single interface (or link) to a network, even though a terminal associated therewith may be aware of multiple links (possible to different access nodes). In such a case, packets sent by the host may be directed to a particular interface (from the host perspective) but benefit from being directed to a particular access node from amongst a plurality of access nodes. In a specific example, packets intended for a first hop router from a host perspective (e.g., packets sent to a one-hop IP multicast address) can be directed to the particular link or the particular access node (base station).

In accordance with an aspect, a method for routing a data packet in a cellular communications environment can comprise receiving a data packet and determining that the data packet should be provided to a particular point of attachment from amongst a plurality of available points of attachment with respect to a wireless terminal in the cellular communications environment. For example, the determination can be made based at least in part upon content of the data packet. The method can additionally comprise encapsulating the data packet in an LLC frame and indicating that the LLC frame should be directed towards a particular point of attachment. Additionally, a wireless communications device described herein can comprise means for receiving a data packet, wherein the data packet is associated with a cellular network. The wireless communications device can also include means for analyzing content of the data packet in connection with ascertaining that the data packet should be provided to a particular point of attachment from amongst a plurality of points of attachment with respect to a wireless terminal and means for encapsulating the data packet in an LLC frame.

In accordance with another aspect, a processor can be configured to execute instructions for receiving a data packet in a cellular communications environment and determining that the data packet should be provided to a certain point of attachment from amongst a plurality of available points of attachment with respect to a wireless terminal, wherein the determination is made based at least in part upon content of the received data packet. The processor can be further configured to execute instructions for encapsulating the data packet in an LLC frame and indicating that the LLC frame should be directed towards the certain point of attachment. Moreover, a machine-readable medium is disclosed below, where in the machine-readable medium can have machine-executable instructions stored thereon for receiving a data packet in a cellular network, encapsulating the data packet in an LLC frame, and analyzing content of the data packet. The machine-executable instructions can further include identifying a primary point of attachment from amongst a plurality of available points of attachment with respect to a wireless terminal, wherein the identification is based at least in part upon the analysis.

In accordance with yet another aspect, a wireless communications apparatus can comprise a memory that retains instructions for encapsulating a received data packet in an LLC frame, wherein the received data packet is associated with a cellular communications network. The memory can retain further instructions for identifying within the packet a particular point of attachment to which the data packet is to be forwarded, the particular point of attachment is identified from amongst a plurality of points of attachment associated with a wireless terminal, wherein the identification is based at least in part upon content of the data packet. The wireless communications apparatus can also include a processor that executes the instructions.

In accordance with still another aspect, a method for routing packets in a wireless communications environment can comprise receiving a data packet that is addressed to a node other than an access node at the access node, determining that the data packet is intended for the access node by analyzing the data packet, and executing instructions at the access node based at least in part upon contents of the data packet. Additionally, a communications device is described herein, wherein the communications device can comprise means for receiving a data packet, means for determining that the data packet is addressed to a network entity that is not a receiving entity, means for determining that the data packet is intended for the receiving entity, and means for executing instructions at the receiving entity based at least in part upon contents of the received data packet.

In accordance with yet another aspect, a processor can be configured to execute instructions for determining that a received data packet is addressed to a first network entity, determining that the received data packet is intended for a second network entity, and executing instructions based at least in part upon contents of the received data packet at the second network entity. Moreover, a machine-readable medium can have machine-executable instructions stored thereon for receiving a data packet that is addressed to a wireless terminal at an access node, determining that the data packet is intended for the access node by analyzing the data packet, and executing instructions at the access node based at least in part upon contents of the data packet.

In still yet another aspect, a communications apparatus can comprise a memory that retains instructions for intercepting a data packet intended for a different wireless communications network entity. The communications apparatus can also include a processor that executes the instructions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
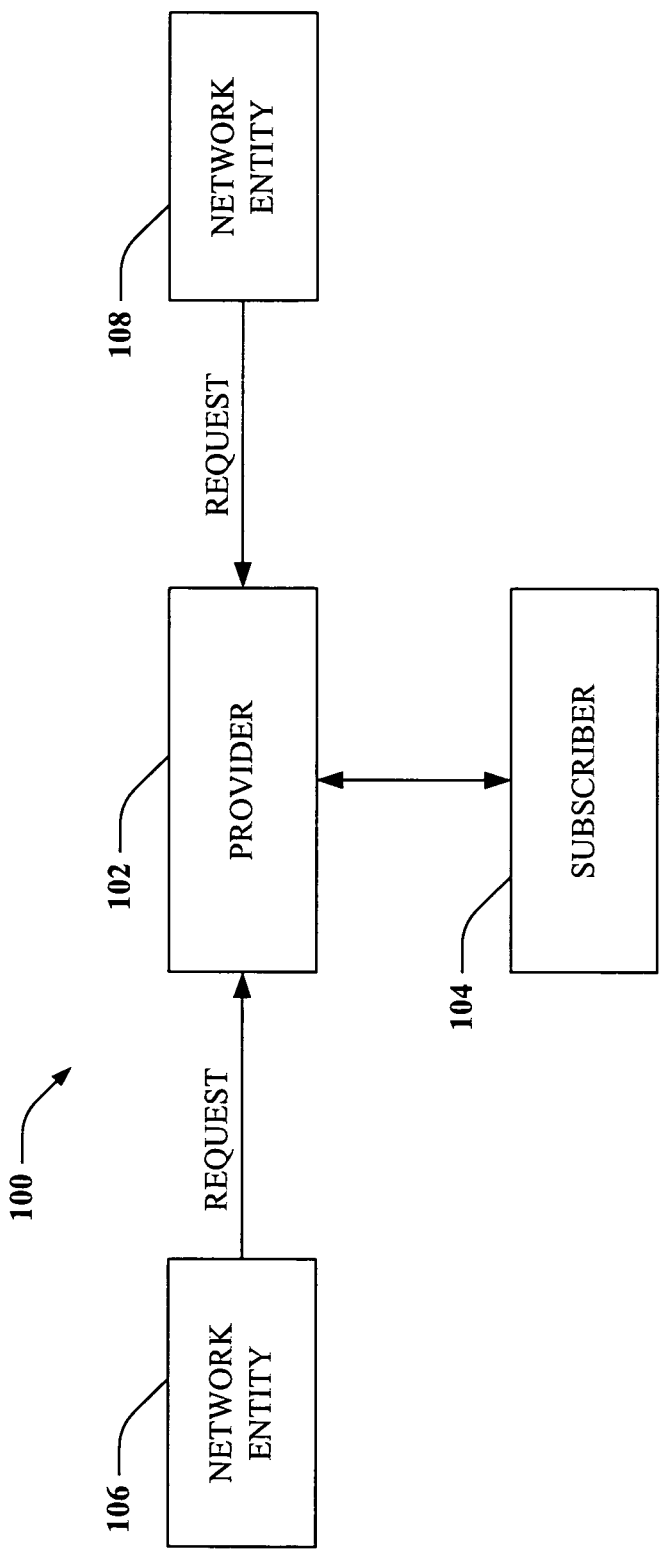
FIG. 1 is a high level block diagram of a system that facilitates provision of requested quality of service treatment with respect to a subscriber.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 that facilitates provision of appropriate QoS treatment to a subscriber is illustrated. As used herein, the term "subscriber" is intended to encompass, for example, an individual, a billable entity, and/or a communications apparatus. System 100 enables network entities, such as application servers, to request QoS support/management on behalf of a subscriber, and additionally enables a host associated with the subscriber to request QoS support and/or management. Thus, requests for QoS support and/or management can originate from network infrastructure or a host that is requesting access to the network. System 100 includes a provider 102, which can provide QoS support to a subscriber 104 that is communicatively coupled thereto. Provider 102 and subscriber 104 can communicate by way of a link, which can be a wireless link, a wirelined link, and/or a combination thereof (e.g., a mobile device that communicates with a router by way of WiFi, and the router communicates with a provider).

In an example, subscriber 104 may be an individual that is associated with a subscription for certain services of a network. In a different embodiment, subscriber 104 can be a mobile handset, a telephone that is coupled to a router, etc. Provider 102, for instance, can be a base station, a router, a modem, or any other network device that is employed to provide data (messages, packets, etc.) to subscriber 104. In an example, provider 102 and subscriber 104 can communicate by way of FLASH OFDM. It is understood, however, that any suitable data transmission protocols are contemplated by the inventors and are intended to fall under the scope of the hereto-appended claims.

System 100 can also include a first network entity 106, which, for instance, can be an application server that can provide certain applications, or application service(s), to subscriber 104 by way of provider 102. For example, first network entity 106 can be a games server that is utilized to provide certain gaming data to subscriber 104 by way of provider 102. System 100 can also include a second network entity 108. For example, second network entity 108 can be a streaming media server that provides access to audio and/or video content to subscriber 104. It is understood, however, that first and second entities 106 and 108 can be any suitable entities that reside within a network.

Pursuant to an example, first network entity 106 can send a request for QoS resources to provider 102, wherein such request relates to QoS with respect to subscriber 104. In other words, first network entity 106 can make a QoS resource request on behalf of subscriber 104. Provider 102 can thereafter determine, for example, whether subscriber 104 is authorized with respect to QoS parameters indicated within the request. Provider 102 can further determine, for example, whether first network entity 106 is authorized to make the particular QoS resource request on behalf of the subscriber 104. If authorization checks are passed, then provider 102 can be employed to provide appropriate QoS to traffic flows that are delivered to subscriber 104 (wherein traffic flow can be defined as related packets of data as indicated within packet headers).

Second network entity 108 can additionally send a request for particular QoS resources to provider 102 on behalf of subscriber 102. For instance, second network entity 108 may be employed to provide data to subscriber 104 by way of provider 102, wherein such data should be associated with particular QoS parameters (e.g., latency, minimum data rate, maximum data rate, . . . ). Thus, provider 102 can receive requests from separate network entities on behalf of a subscriber. For instance, such requests can be received and serviced at substantially similar times (such as when a user is undertaking a voice call and downloading data from the Internet). Additionally, while not shown, subscriber 104 can be associated with a host that requests QoS support and undertakes QoS management on behalf of subscriber 104 by delivering a request to provider 102. Such request can be provided and/or services at a substantially similar time as other requests (e.g., from first and/or second network entity 106 and 108).

The above-described flexibility in requesting QoS support can be enabled through one or more protocols. For instance, a substantially similar protocol can be utilized by first and second network entities 106 and 108 as is used by a host associated with subscriber 104. The protocol can include message formats that can be utilized by internal network entities as well as hosts on a periphery of a network (and understood by provider 102). One example protocol that can be employed is a MARC protocol, which has been designed to accommodate subscriber mobility, such as when subscriber 104 alters points of attachment within a network. The MARC protocol defines various messaging formats that facilitate subscriber mobility, for example, in an packet-switched mobile environment. Each message/request can include a common message header followed by a variable number of typed objects, where presence, order, and number of typed objects is based at least in part upon message type (as identified in the message header). Each typed object can include a common object header followed by a variable number of object specific fields. Various message types can be utilized, including an add request message, which is an example of what is sent to provider 102 with respect to requesting particular QoS treatment for a traffic flow to and/or from subscriber 104. Additionally, a modify request message can relate to modifying existing QoS treatment with respect to one or more traffic flows associated with subscriber, and a delete request message can relate to deleting existing QoS treatments. QoS treatments encompass particular services as well as filter rules to identify data packets subject to certain services. Below is an example of an add request in accordance with a protocol that may be utilized in connection with system 100.

```
<MARC.Add Message> ::= <Common Message Header>
    [<INTEGRITY Object>]
    [<REQ_ID Object>]
    [<PROV_ID Object>]
    [<SUB_ID Object>]
    <SS_ID Object>
    <Addition(s)>
    [<POLICY Object>]
<Addition(s)> ::= <Service Class Instance(s)> |
    <Filter Rule(s)> |
    <Service Class Instance(s)> <Filter Rule(s)>
<Service Class Instance(s)> ::= <SCI Object> |
    <Service Class Instance(s)> <SCI Object>
<Filter Rule(s)> ::= <FR Object> |
    <Filter Rule(s)> <FR Object>
```

In this example, an "INTEGRITY" object is an object that facilitates ensuring integrity of the add request. An "INTEGRITY" object can include a timestamp, an index that identifies a security attribute for validation of message integrity, and an integrity check value, which can enable validation of message integrity. A "REQ_ID" object is a requester identifier, which can include an IP address of a requester. A "PROV_ID" object is a provider identifier, which can include an IP address of a provider. A "SUB_ID" object is a subscriber identifier object, which can include an IP address of a subscriber. An SS_ID object is a subscriber service identifier object, which can identify one of several subscriber services. The "Addition(s)" fields relate to particular services or filter rules that are requested by the requester. For instance, the above add message can describe that filter rules and service class instances are desirably added, and such filter rules and service class instances can be specifically provided in the add message through use of an "SCI Object" (service class object) and "FR Object" (filter rule object). An "SCI Object" can include a service class identifier and an amount of time that the service class should be maintained by the provider in the absence of being refreshed. An "FR Object" can include an identifier of a particular filter rule, a priority to be associated with the rule, and various match criteria.

Figure 2:
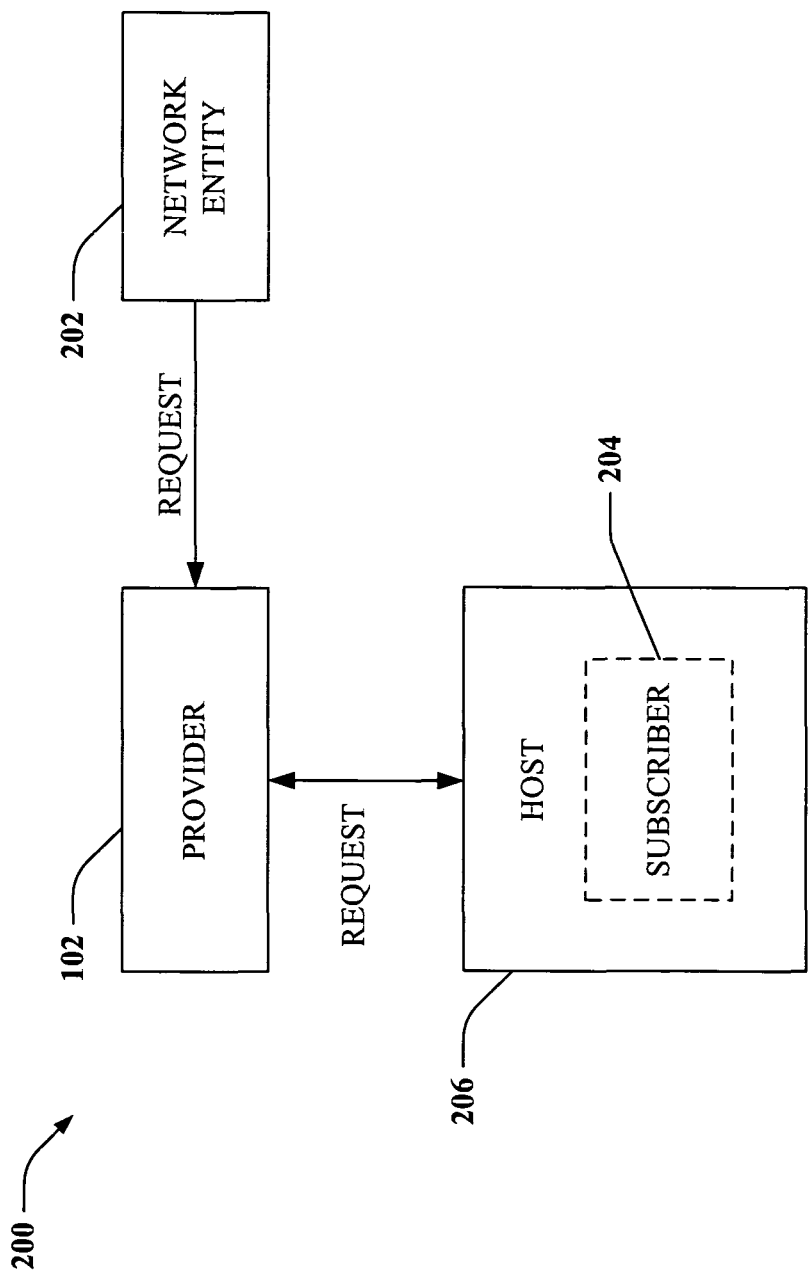
FIG. 2 is a block diagram of a system that facilitates provision of requested plurality of service treatment with respect to a subscriber, wherein at least one request originates form a subscriber-side device.

Turning now to FIG. 2, a flexible system 200 that enables request of QoS resources and/or request for QoS management on behalf of a subscriber to occur from multiple, separate entities. System 200 includes provider 102, which, as described above, may be a base station in a wireless communications environment. Additionally, provider 102 can be router, a modem, or any other suitable access node within a wireless or wirelined network. System 200 can also include a network entity 202, such as an application server, that creates a QoS resource request and sends it to provider 102, wherein the request pertains to a subscriber 204. In the example system 200, subscriber 204 is encapsulated with and/or behind a host 206, which interfaces to a network by way of provider 102. For example, subscriber 204 may be a PCMCIA card or other suitable card, a communications device coupled to a computer, or any other suitable device, while host 206 may be a computer, a mobile telephone, a personal digital assistant, etc.

Host 206, like network entity 202, can create a request for QoS resources and/or QoS management and provide such request to provider 102. Therefore, different logical entities can create a request on behalf of subscriber 204 with respect to QoS. Additionally, such entities (e.g., network entity 202 and host 206) can reside on different portions with respect to a network. In other words, network entity 202 can reside within a network infrastructure while host 206 can reside on a "subscriber side" of an access link to/from a network. As described above, host 206 can communicate with provider 102 by way of a wireless link, for instance. Additionally, a protocol utilized by host 206 to provide the QoS request to provider 102 can be substantially similar to a protocol utilized to relay a request by network entity 202. In different situations it may be desirable to allow different entities to request QoS support for subscriber 204, and system 200 provides such flexibility, as a request can for QoS support/management on behalf of subscriber 204 can initiate from one or more network entities and/or a host.

Figure 3:
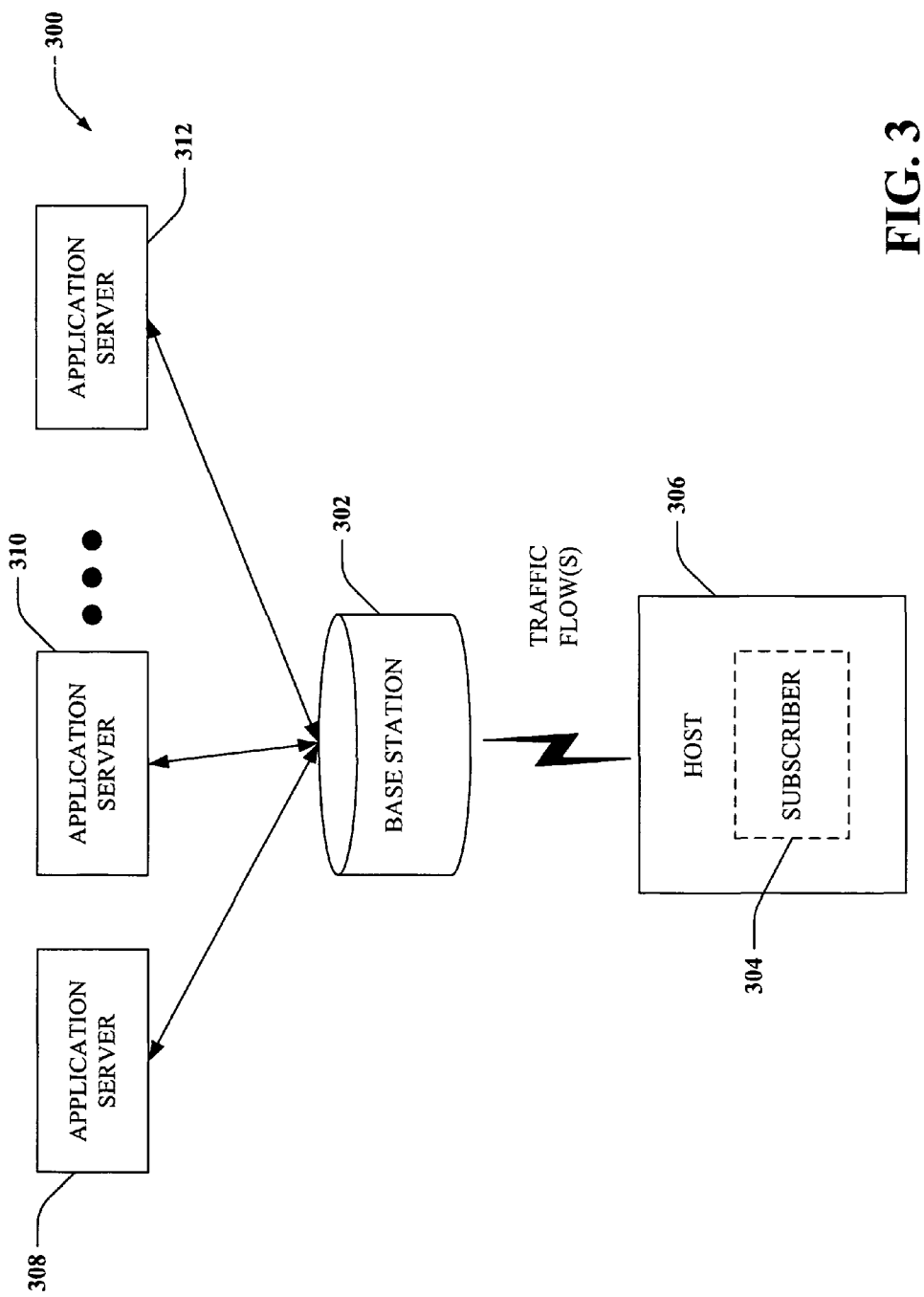
FIG. 3 is a block diagram of a system, illustrating provision of quality of service treatment with respect to a subscriber based upon multiple requests created by multiple application servers.

Now referring to FIG. 3, an example system 300 that illustrates requesting and provisioning of QoS resources is illustrated. System 300 includes a base station 302, which is utilized in connection with providing network services to a subscriber 304. In wireless environments, one or more base stations are utilized to provide geographic regions of coverage to one or more wireless communication devices. Typically, base stations are arranged such that a large, continuous geographic region is provided with wireless network coverage. Base station 302 includes a transmitter and receiver, for instance, to enable base station 302 to provide subscriber 304 with data and receive data from subscriber 304. Base station 302 acts as an access node to a network. Subscriber 304 is associated with a host device 306, which may be a mobile device, a personal computer, or other suitable host device.

System 300 additionally includes multiple application servers 308-312 that can, e.g., if associated with a subscription of the subscriber 304, be utilized in connection with providing certain services to subscriber 304. In a detailed example, application server 308 may be a gaming server, thereby providing subscriber 304 with data relating to one or more video games. Application server 310 may be associated with voice calls, and application server 312 can be a web server, for instance. To optimize receipt and/or delivery of data by way of application servers 308-312 while not wasting network resources, QoS parameters relating to data provided between base station 302 and subscriber 304 should be tightly controlled. However, different applications (provided by application servers 308-312) should be associated with different QoS parameters. For example, voice data does not need a substantial amount of bandwidth, but latency should be low. In another example, gaming data may utilize three traffic flows operating in parallel to enable appropriate play of the game. In still another example, downloading a file may not require low latency but may need substantial bandwidth to receive a file in a timely manner. Thus, each of the application servers 308-312 may provide requests relating to particular QoS parameters that should exist between base station 302 and subscriber 304. Base station 302 can thereafter be employed to provide requested QoS treatment to traffic flows that are interchanged between base station 302 and subscriber 304 (if subscriber 304 is authorized for such services and/or QoS).

Moreover, host 306 can detect that subscriber 304 is not receiving appropriate QoS treatment with respect to one or more data flows given current state of subscriber 304. Additionally or alternatively, subscriber 304 can detect incorrect treatment of data flows and provide host 306 with an indication that QoS treatment with respect to one or more data flows should be updated. Host 306 can then create such request and then be utilized in connection with relaying the request to base station 302. In another example, host 306 can generate QoS requests based upon requirements of applications running on host 306. In such a case, an application running on host 306 can send requests by way of an application programming interface (API).

Base station 302 can thereafter provide appropriate QoS treatment to subscriber 304 according to contents of the request. Thus, as can be discerned, multiple network entities and/or a host can request QoS support and/or management on behalf of a subscriber, and base station 302 can receive and service such requests. For instance, base station 302 can service requests simultaneously (e.g., provide appropriate QoS treatment to multiple traffic flows based upon multiple requests from several entities).

Figure 4:
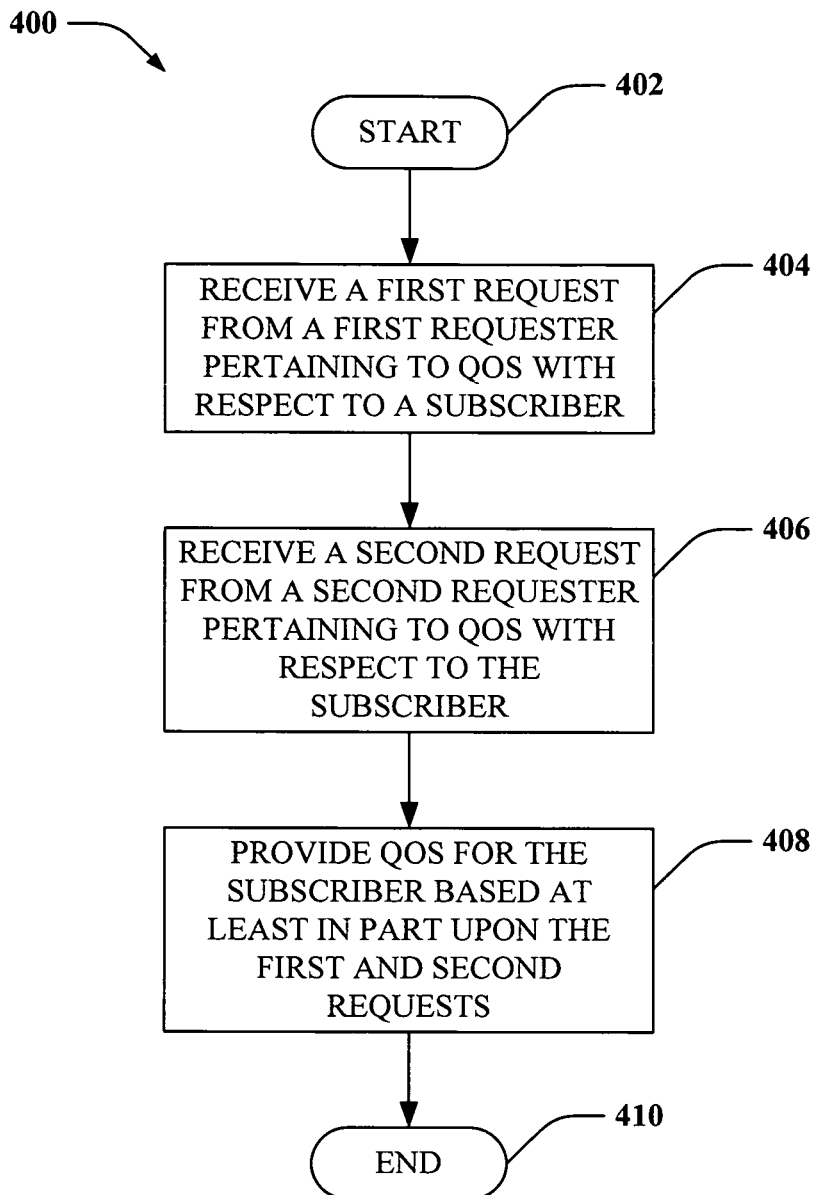
FIG. 4 is a representative flow diagram illustrating a methodology for providing requested quality of service treatment to a subscriber.
Figure 5:
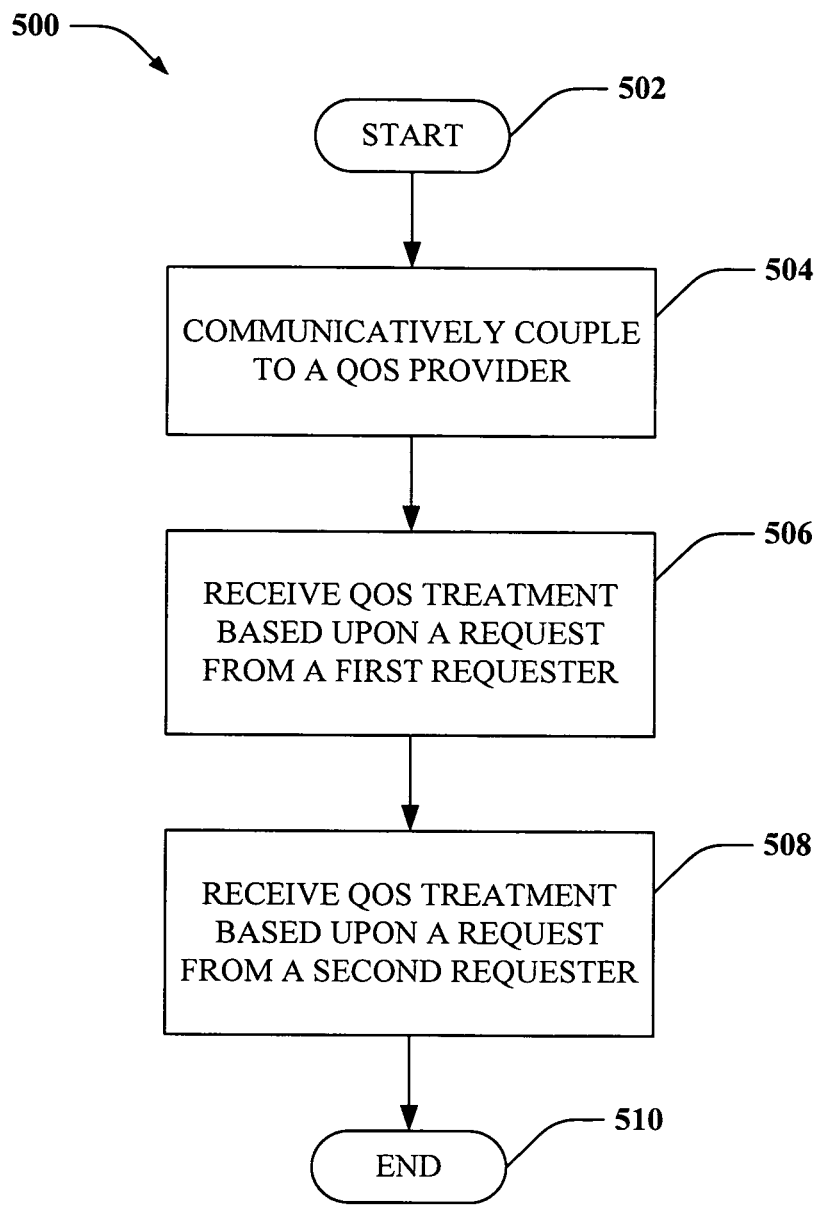
FIG. 5 is a representative flow diagram illustrating a methodology for receiving quality of service treatment based upon multiple requests from different entities.

Referring to FIGS. 4-5, methodologies relating to communications in a network environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Turning specifically to FIG. 4, a methodology 400 for providing QoS for a subscriber based upon one or more requests made by multiple entities is illustrated. The methodology 400 begins at 402, and at 404 a first request is received from a first requester, wherein the first request pertains to QoS with respect to a subscriber. For instance, the first requester can be an entity within a network infrastructure, such as an application server. In another example, the first requester can be a subscriber, a host, another application server, or any other suitable network entity. The QoS request can relate to one or more traffic flows to and/or from the aforementioned subscriber. At 406, a second request is received from a second requester relating to QoS with respect to the subscriber, wherein the request is generated on behalf of such subscriber. Again, the requester can be an application server or other suitable entity within a network infrastructure, or can be a subscriber-side device, such as a personal computer, a mobile handset, etc. In an example, the request provided by the first requester and the request provided by the second requester can be associated with a substantially similar protocol (e.g., MARC). At 408, QoS is provided with respect to the subscriber based at least in part upon the first and second requests. For example, the first and second requests can be delivered to a provider, such as a base station. The provider can then provide the subscriber with QoS parameters defined within the request (whether such parameters are strictly defined or relative). The methodology 400 then completes at 410.

With reference to FIG. 5, a methodology 500 for receiving QoS treatment based at least in part upon one or more requests for QoS support/management is illustrated. The methodology 500 starts at 502, and at 504 a subscriber is communicatively coupled to a QoS provider. For instance, the subscriber and provider can be communicatively coupled by way of a wireless link (e.g., within a FLASH OFDM system). In another example, the coupling can be wired in nature, such as through Ethernet cable or other suitable coaxial cable, a digital subscriber line, or any other suitable cable. At 506, QoS treatment is received with respect to at least one traffic flow that is associated with the subscriber, wherein the treatment is provided in response to a request that is initiated by a first requester. The requester can be a host, an infrastructure device such as an application server, and/or the like. At 508, additional QoS treatment is received with respect to at least one traffic flow associated with the subscriber, wherein the additional QoS treatment is provided in response to a request that is initiated by a second requester. Again, such requester can be a host, an application server, an advertising server, etc. Thus, QoS treatment is provided to a subscriber based at least in part upon separate requests for such treatment, wherein the separate requests are provided by different entities. The methodology 500 then completes at 510.

Figure 6:
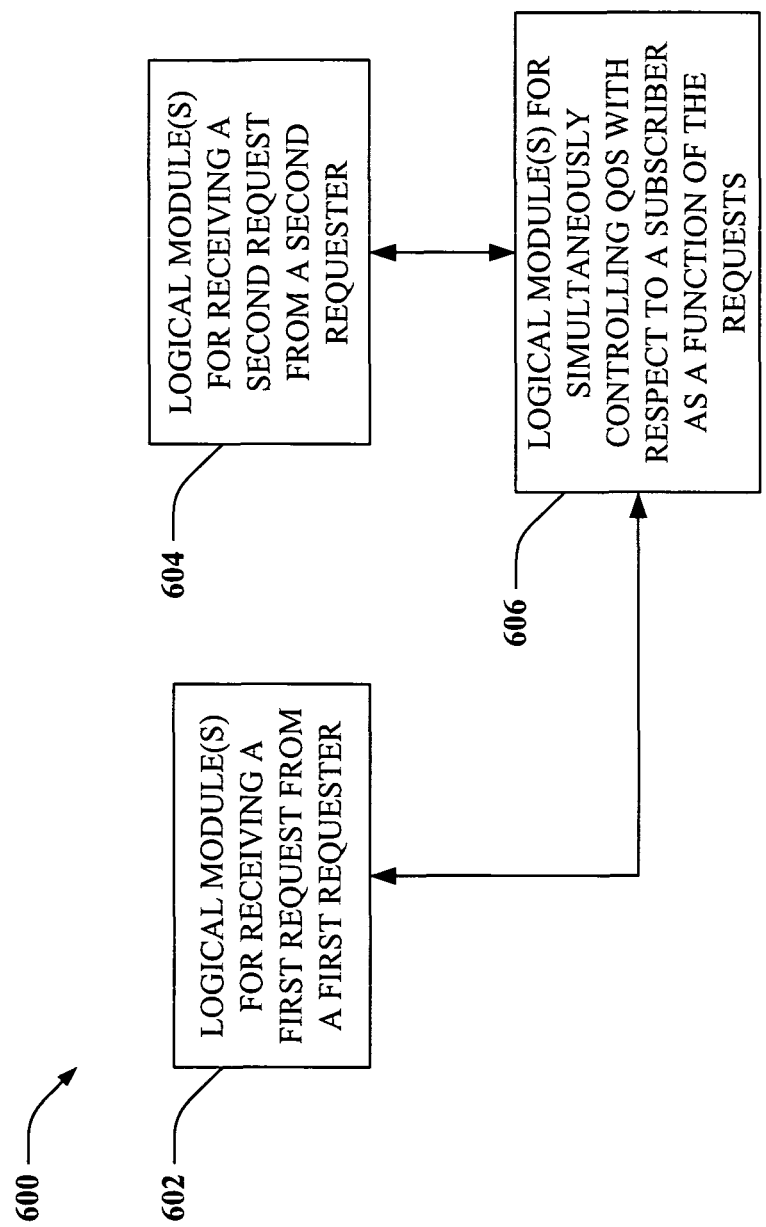
FIG. 6 is a block diagram of a system that facilitates provision of requested quality of service treatment with respect to a subscriber.
Figure 7:
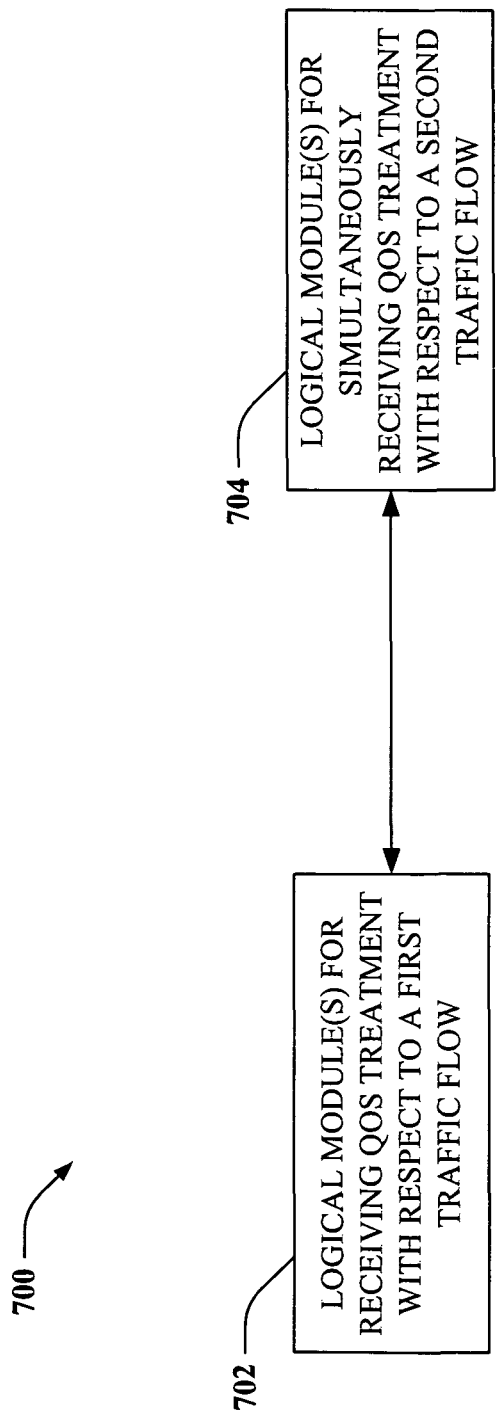
FIG. 7 is a block diagram of a system that facilitates receipt of quality of service treatment with respect to a subscriber.

Turning now to FIGS. 6-7 collectively, systems are provided that relate to provision of particular QoS treatment with respect to a subscriber. The systems are represented as a series of interrelated functional blocks, which can represent functions implemented by a processor, software, hardware, firmware, or any suitable combination thereof. Referring specifically to FIG. 6, a system 600 that facilitates provision of QoS treatment based upon multiple requests on behalf of a subscriber is illustrated. In an example, a provider, such as a base station, can comprise system 600. System 600 includes logical module(s) for receiving a first request from a first requester 602, wherein such request can be made on behalf of a subscriber with respect to QoS support for the subscriber (e.g., the request relates to QoS treatment provided to incoming/outgoing data from the subscriber). Logical module(s) 602 can include, for instance, an antenna, a network port, a processor, memory, software, hardware, firmware, and/or any other suitable modules that may be utilized in connection with receiving the first request. System 600 additionally includes logical module(s) for receiving a second request relating to QoS from a second requester 604, wherein the second request is made on behalf of the subscriber. For example, the requester can be an application server, a host associated with the subscriber, etc. Module(s) 604, like logical module(s) 602, can include an antenna, a network port, a receiver chain, and/or the like.

System 600 can additionally include logical module(s) for simultaneously controlling QoS with respect to a subscriber as a function of the first and second request 606. The terms "providing QoS", "support QoS", "managing QoS", and the like are intended to encompass traffic conditioning, including metering, marking, policing, queue management, scheduling, ARQ, etc. Module(s) 606 can include a processor, memory, a scheduling application that aids in scheduling data over a link, and the like. Logical module(s) 606 can also provide QoS support to the subscriber based upon multiple other requests. Moreover, module(s) 606 can be configured to provide QoS support with respect to multiple requests made by multiple requesters simultaneously.

Now turning to FIG. 7, a system 700 for receiving QoS treatment from a provider is illustrated. For instance, a terminal (end node) can comprise system 700. System 700 includes logical module(s) for receiving QoS treatment with respect to a first traffic flow, wherein such module(s) can include an antenna, software/hardware that enables a link to be created between an access node, e.g., base station, and a subscriber device, e.g., terminal. Additionally, the first traffic flow can relate to a request for QoS support made by a first requester. System 700 additionally includes logical module(s) for simultaneously receiving QoS treatment with respect to a second traffic flow, wherein the second traffic flow can be associated with a request for QoS support made by a second requester. The module(s) 704 can include an antenna, a processor, memory, hardware, software, firmware, and/or the like.

Figure 8:
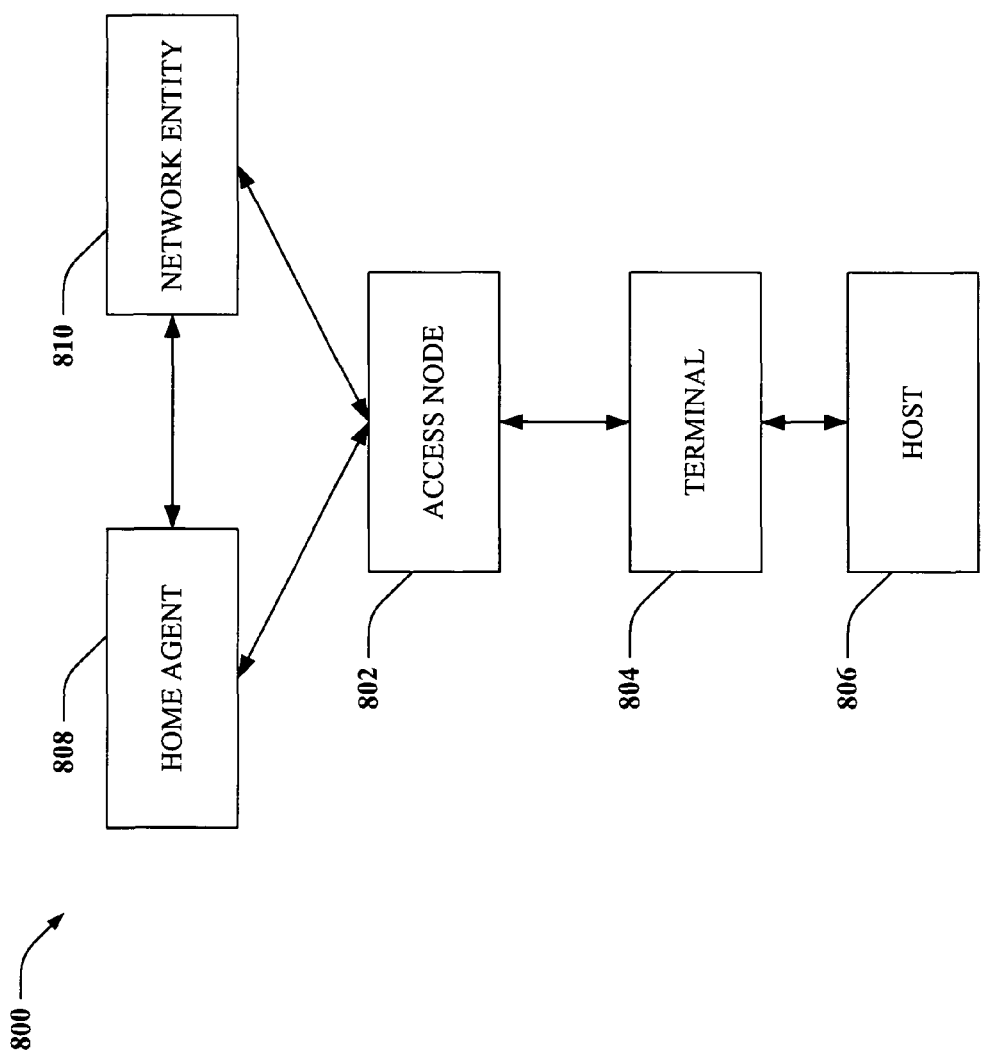
FIG. 8 is a block diagram of a system provided to illustrate routing within a packet-switched environment and signaling to an access node.

Referring now to FIG. 8, a system 800 that aids in mobility management within a communications network is illustrated. While system 800 is shown as including various modules or entities, it is understood that in some aspects a subset of such entities can be utilized to perform functionality as described herein. System 800 includes an access node 802, which, for instance, can be a base station. Access node 802 is communicatively coupled to a terminal 804, which in turn is associated with a host 806. Terminal, for instance, can be a processor, PCMCIA card, and/or memory card, and host 806 can be a device that includes the processor or memory card. In another example, terminal 804 and host 806 can be separate entities, such as a computer and a peripheral device, e.g., desktop modem. It is also to be understood that terminal 804 is communicatively coupled to access node 802 only while terminal 804 is within a coverage area of access node 802. For instance, if terminal 804 were to be geographically repositioned, such terminal 804 could alter points of attachment to a network (e.g., communicatively couple to a disparate access node). Additionally, while not shown, terminal 804 can be communicatively coupled to more than one access node during a single instance in time, wherein one of such nodes is labeled as a primary node.

System 800 can additionally include a home agent (HA) 808, which can be employed to track where in a network terminal 804 resides, e.g., to support forwarding of packets to the terminal 804 and/or the host 806 by way of the current point of attachment. For example, if terminal 804 alters a point of attachment, home agent 808 (through various messaging) can be made aware of such change in point of attachment. Home agent 808 can be communicatively coupled to access node 802, either by direct connection or through one or more other network entities. System 800 can also include a network entity 810 that may desirably provide data or services to terminal 804 and/or host 806. For example, network entity 810 can be an application server, such as a gaming server, that desirably provides particular traffic flows to terminal 804 by way of access node 802.

The system 800 can employ various mechanisms in connection with providing data to access node 802, wherein such access node 802 is the point of attachment at the IP layer with respect to terminal 804. For instance, if an address (e.g., IP address) of access node 802 is known (e.g., by network entity 810), then data can be provided directly to access node 802 by way of such address. In other words, it can be known that access node 802 is a point of attachment for terminal 804 (e.g., one of several points of attachment for terminal 804 ). If address of access node 802 is known, then data packets intended for terminal 804 or provided by terminal 804 can be directed to an address associated with access node 802. Additionally, packets, e.g., control signaling and/or messages, pertaining to terminal 804 and/or host 806 can be directed to an address associated with access node 802.

Often, however, as terminal 804 is mobile within a network, point of attachments can change. Thus, network entities may not be aware of which access node is a current point of attachment for terminal 804, and thus may be unaware a specific address. Additionally, host 806 may wish to relay data and/or signaling to a particular entity but may not have knowledge of which access node is the current point of attachment (or a current primary point of attachment). In one example, access node 802 can intercept messages that are addressed to different network entities (but in actuality are intended for access node 802 ). In an example, network entity 810 may wish to provide a QoS request to a point of attachment associated with terminal 804, but may not be aware that access node 802 is such point of attachment. Accordingly, network entity 810 can, for instance, access home agent 808 to determine which access node is currently associated with terminal 804.

Alternatively, network entity 810 can direct, e.g., address, a message to terminal 804 (or host 806 ) and provide an indication in the message, e.g., setting one or more header fields to a predetermined value such as a particular port number, that while the message is directed to terminal 804 (or host 806 ) it is actually intended for an access node that is the point of attachment for terminal 804. In some embodiments the indication includes use of a router alert option in the IP header. The indication can be a message that may be routed and/or forwarded toward terminal 804 by way of access node 802 using a variety of techniques. The path taken by the message to access node 802 can include one or more intermediate nodes, e.g., home agent 808. When access node 802 receives the message, access node 802 can analyze the message and determine, e.g., based on inspection of one or more header fields, that the message (e.g., packet), while addressed to terminal 804 (or host 806 ), is in actuality intended for access node 802. Access node 802 can then perform operations (or determine whether to perform operations) based at least in part upon contents of the received message. Additionally, access node 802 can create a message informing network entity 810 that access node 802 is, for instance, a primary point of attachment with respect to terminal 804, where such message can inform network entity 810 of an address associated with access node 802 to enable subsequent message exchanges without the need to intercept messages directed to the terminal 806.

In another example, host 806 (or another entity on a subscriber-side of a network link) can desirably provide a message to access node 802, but may not be aware of an address of such access node. In another example, host 806 may be associated with wireless links between several access nodes, and may desirably provide a message to one of such access nodes. Accordingly, host 806 can address a message to network entity 810, indicating within such message that, in actuality, the message is intended to be received and analyzed by access node 802. Additionally or alternatively, terminal 804 can intercept the message, encapsulate such message within a Logical Link Control (LLC) frame (indicating that the message is intended for the base station).

In an example, host 806 may desirably request particular QoS support with respect to services provided by network entity 810. Accordingly, host 806 can create a message addressed to network entity 810, and can indicate within the message that it is intended for access node 802 (even though the message is addressed to network entity 810). Example manners of indicating that a message is intended for access node 802 are described above (e.g., router alert within an IP header). One-hop multicasting can also be employed in connection with providing a message to an appropriate point of attachment, wherein such multicasting is described in greater detail below.

Figure 9:
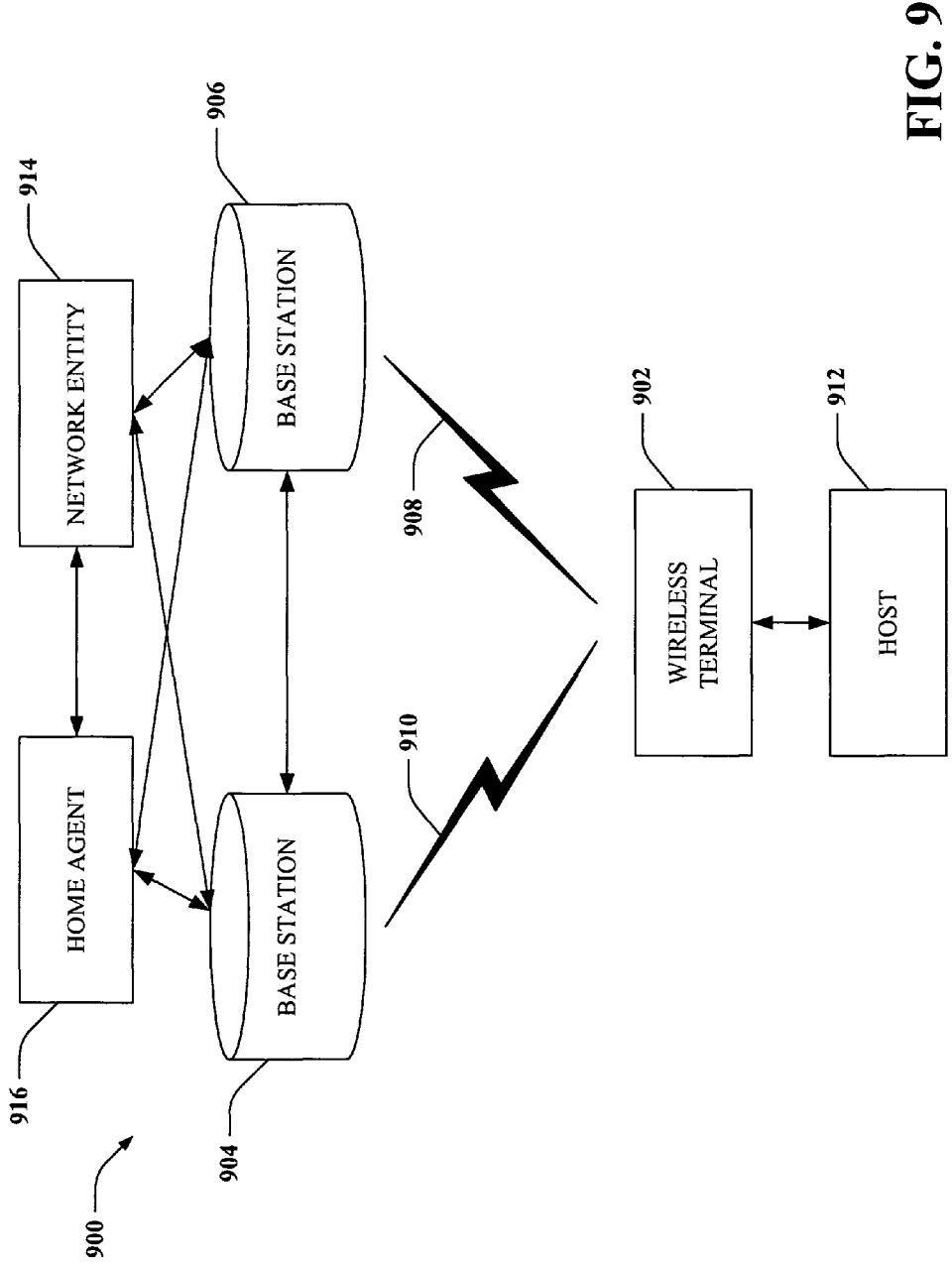
FIG. 9 is a block diagram of a system that is utilized to illustrate mobility management functionality in a packet-switched wireless communications environment.

Turning now to FIG. 9, an example system 900 is provided that illustrates utilization of one-hop message routing and/or message interception and selective forwarding in connection with simultaneous connectivity to multiple points of attachment is illustrated. System 900 includes a wireless terminal 902, which is configured to create links to multiple base stations at a single instance in time, if desirable. For example, wireless terminal 902 can be associated with multiple antennas and/or can be in a wireless environment where multiple links to multiple base stations with respect to a single wireless terminal is supported (e.g., FLASH OFDM). Thus, for instance, wireless terminal 902 can be associated with wireless links to two base stations at a single point in time, e.g., base station 904 and base station 906. One of such base stations 904 and 906 may desirably be designated as a primary point of attachment (e.g., at the IP layer). For example, base station 904 may be desirably designated as the primary point of attachment. In some instances, however, the primary point of attachment 904 may not be the optimal base station by which to send/received data—rather, base station 906 may be utilized for transmission of data. Pursuant to an example, it may be detected that signal-to-noise ratio associated with a link 908 with base station 906 is lower than signal-to-noise ratio associated with a link 910 with base station 904. Accordingly, a scheduling application associated with wireless terminal 902 and/or network infrastructure devices can cause data to be received/sent at a non-primary point of attachment. Thus, at various intervals of time, packets, e.g., messages or frames, can be sent/received by way of either point of attachment as deemed preferred based on some criteria, e.g., signal-to-noise ratio, loading, etc.

In some instances, however, it may be imperative to provide a specific point of attachment, e.g., the primary point of attachment, with certain packets, e.g., messages or frames.

For example, a primary point of attachment should receive "connect" messages. In IP traffic, however, data is typically forwarded on a packet-by-packet basis using connectionless hop-by-hop routing, such that a packet sent from terminal 902 to a point of attachment, e.g., either first base station 904 or second base station 906, is often destined for some other node and thus is in actuality subsequently relayed elsewhere. To address such an issue, one-hop multicasting can be utilized. For instance, a host 912 can provide messages or packets to one or more one-hop multicast addresses. Often, utilizing the one-hop muiticast address(es) is used to communicate with a function or entity on a directly connected link when a unicast address is unknown. In some instances, however, it may be desirable to direct certain packets (e.g., packets addressed to a one-hop multicast address) to a particular point of attachment (e.g., a primary point of attachment). In an embodiment, packets originating from host 912 can be inspected to determine if such packets should be delivered to a particular point of attachment amongst a plurality of points of attachment (e.g., a primary point of attachment). As an example, each packet provided from host 912 that is directed towards a one-hop multicast address can be directed to a primary point of attachment Moreover, as alluded to above, interception can occur amongst network infrastructure devices in connection with communicating with points of attachment. For instance, system 900 can include a network entity 914, which may desire to provide a message to a primary point of attachment with respect to wireless terminal 902 (but is not aware of identity and/or address of such point of attachment).

In still another example, base stations 904 and 906 can be communicatively coupled and act as routers, switches, or bridges. For instance, a packet may desirably be provided to first base station 904, but in actuality gets provided to second base station 906, e.g., because the link from wireless terminal 902 to second base station 906 was substantially better at the time that the packet was transmitted. Base station 906 can recognize (by some indication within the packet) that the packet is intended for base station 904, and can relay or re-direct such packet to first base station 904. For example, a packet addressed to a one-hop multicast address would typically not be forwarded beyond the direct link upon which it was sent. If second base station 906 receives a packet addressed to a one-hop multicast address, and determines that packets sent to one-hop multicast addresses should be provided to the first base station 904 (e.g., because first base station 904 is designated as the primary point of attachment), then second base station 906 can re-direct such packet to first base station 904, e.g., encapsulate the received packet in another packet or frame addressed to first base station 904.

Figure 10:
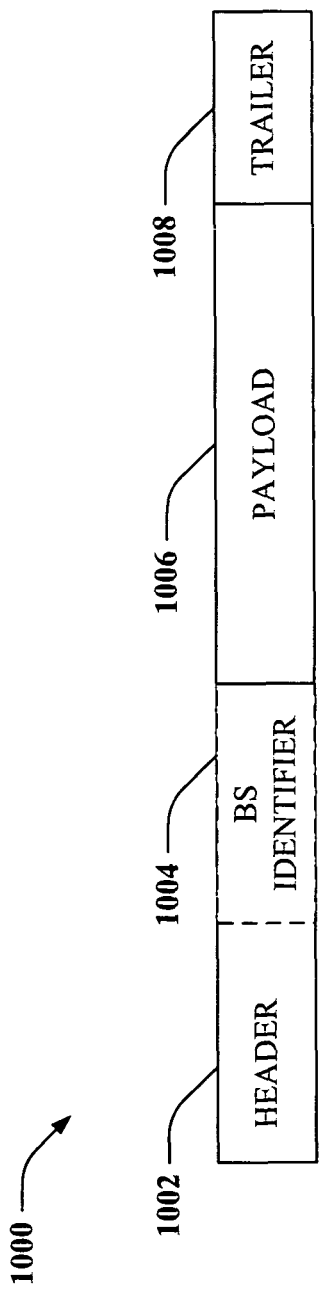
FIG. 10 illustrates an example Logical Link Control (LLC) frame.

Turning now to FIG. 10, an example LLC frame 1000 is illustrated. LLC frame 1000 can include a header portion 1002, which can comprise, for instance, an identifier 1004 of a base station or an indication that the frame 1000 should be forwarded to a particular entity or intercepted by a particular entity. LLC frame 1000 call also include a payload 1006, which may include requests, for instance, for certain QoS treatment with respect to particular traffic flows, e.g., a QoS resource control message carried in an IP packet destined to a one-hop multicast address. LLC frame 1000 can additionally include a trailer 1008, such as a CRC. Such frame 1000 can be employed to encapsulate a message when the initiator of such message does not have knowledge of an identity and/or address of a primary point of attachment with respect to a wireless terminal. For instance, a wireless terminal can classify a message received from a host (based on inspection of header and/or payload fields) and encapsulate the message within an LLC frame similar to that described herein. While LLC frames are described herein, it is understood that any suitable manner for re-routing a message to an intended recipient is contemplated by the inventors and intended to fall under the scope of the hereto-appended claims.

Figure 11:
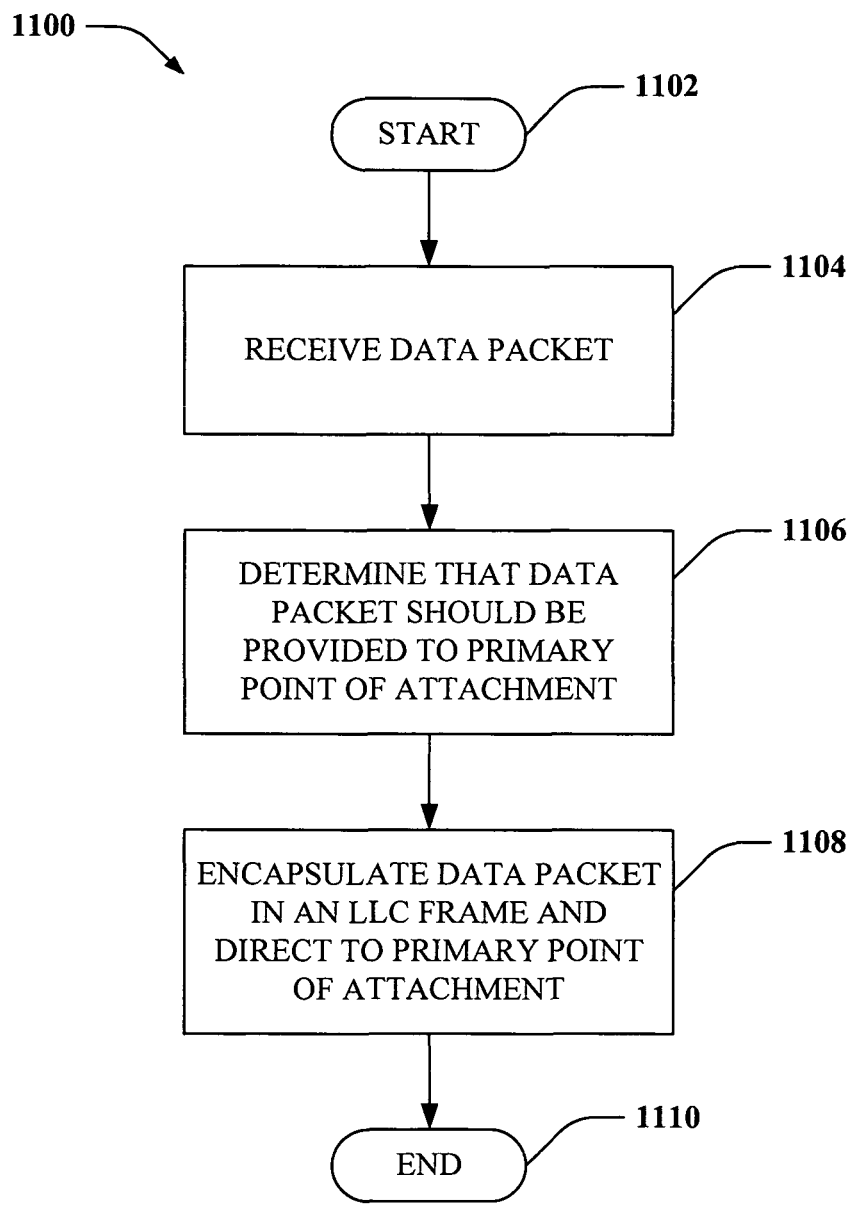
FIG. 11 is a representative flow diagram illustrating a methodology for encapsulating a received data packet in an LLC frame.

Now referring to FIG. 11, a methodology 1100 for encapsulating a data packet within an LLC frame in connection with providing contents thereof to a point of attachment (e.g., a primary point of attachment) is illustrated. The methodology 1100 starts at 1102, and at 1104 a data packet is received. For example, the received data packet can include QoS requests with respect to a particular wireless terminal, wherein such request can desirably be provided to a particular base station (e.g., a primary point of attachment). For instance, the data packet can be received by a wireless terminal from a host device. At 1106, a determination can be made that the data packet should be provided to a primary point of attachment. For example, the data packet can be addressed to a one-hop multi-cast address.

At 1108, the data packet is encapsulated in an LLC frame, for instance, and directed to the primary point of attachment. Such encapsulation can occur at a wireless terminal, for example. Once encapsulated, the frame can be provided to an appropriate point of attachment and/or routed to such point of attachment. The methodology 1100 then completes at 1110.

Figure 12:
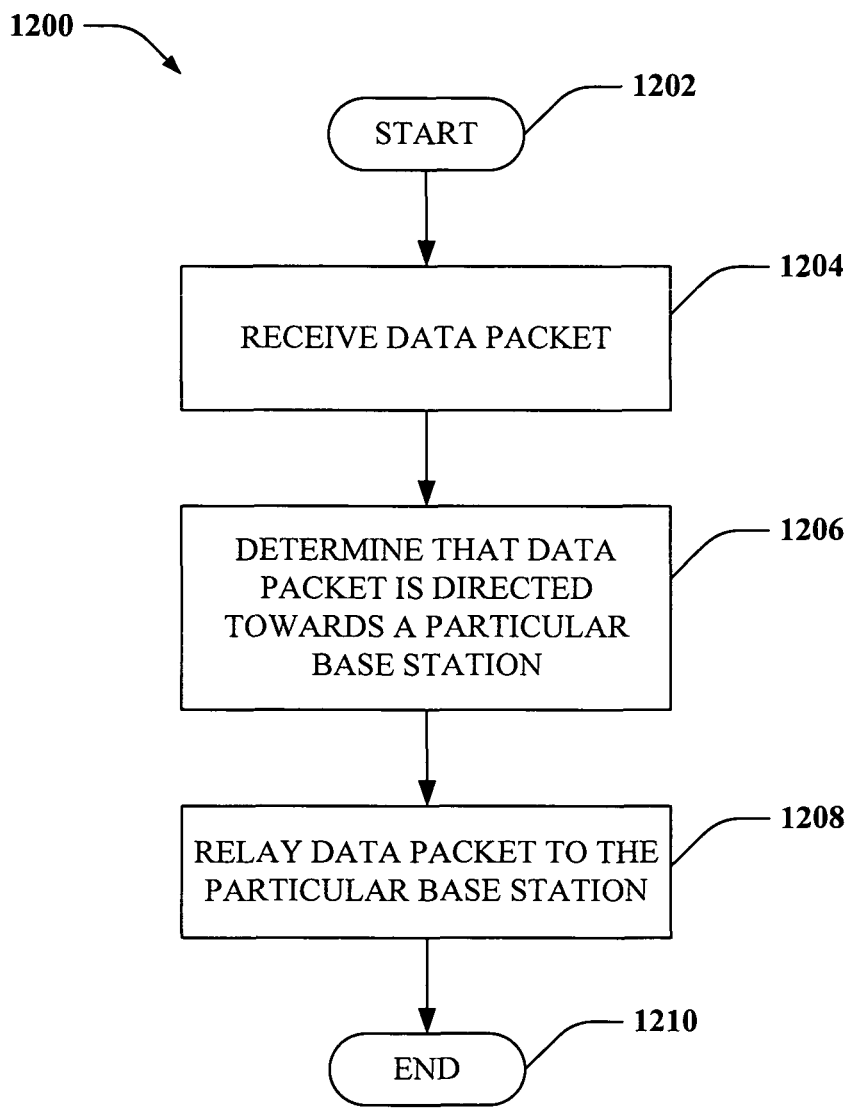
FIG. 12 is a representative flow diagram illustrating a methodology for performing unicast data transmission.

Now turning to FIG. 12, a methodology 1200 for performing a unicast relay of a data packet is illustrated. The methodology 1200 begins at 1202, and at 1204 a data packet is received. For instance, a wireless terminal can receive the data packet from a host. In another example, a home agent can receive the data packet from another network infrastructure device. At 1206, it is determined that the data packet is addressed to a particular base station (point of attachment). For example, the data packet can indicate an IP address of the base station. At 1208, the data packet is relayed to the base station, and at 1210 the methodology completes. This unicast routing can be supported in a flexible system that additionally supports one-hop multicasting as well as interception and relay of messages wherein the base station identity/address is not known at time of creation of the message.

Figure 13:
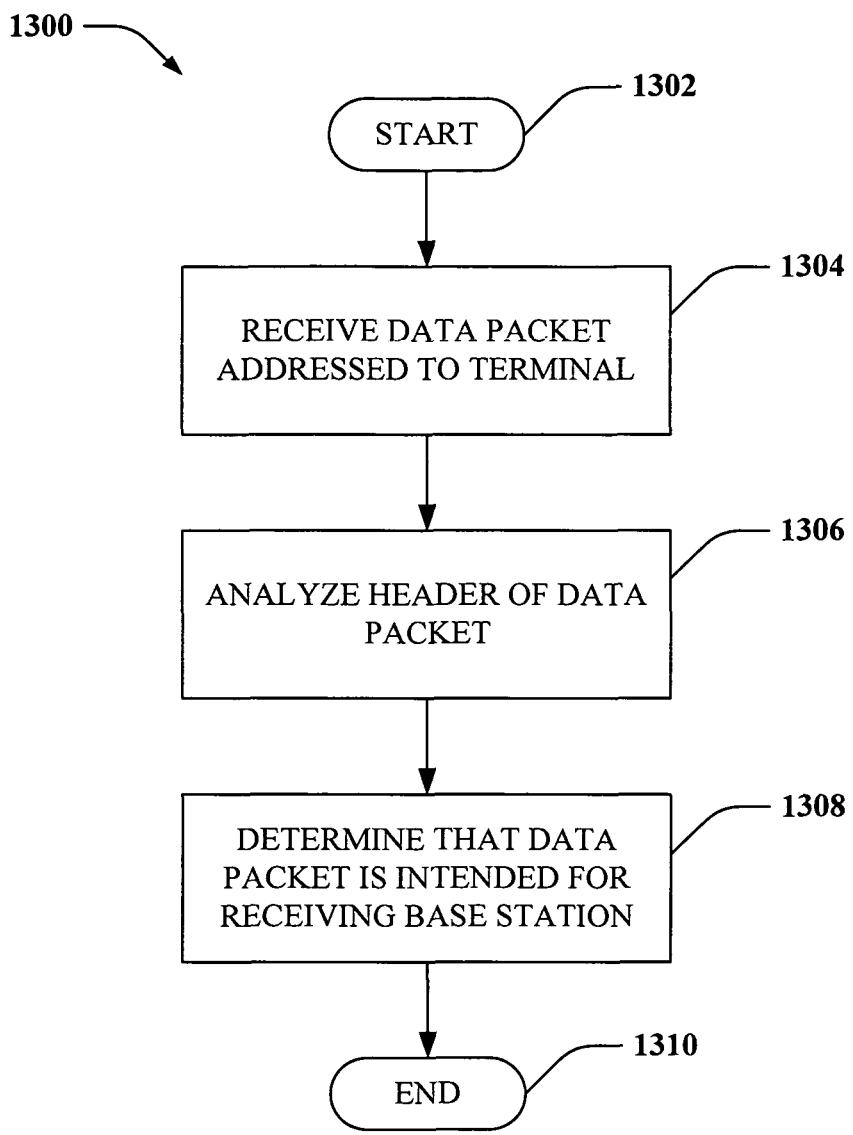
FIG. 13 is a representative flow diagram illustrating a methodology for performing interception of a data packet.

Referring now to FIG. 13, a methodology 1300 for intercepting a message in a wireless communications environment is illustrated. Interception may be desirable when a party creating a message does not have knowledge of a particular base station associated with a wireless terminal (due to mobile capabilities of the wireless terminal). Such methodology 1300 can be performed, for instance, in a packet-switched wireless network. Methodology 1300 starts at 1302, and at 1304 a data packet is received, wherein the data packet is addressed to a particular wireless terminal. The data packet can be received at a base station, for example. At 1306, the header of the packet is analyzed, as the header can include an indication that the packet should be retained and analyzed rather than forwarded to the wireless terminal. For instance, a base station can determine to intercept the packet based on inspection of one or more fields in the header and/or payload, e.g., match a specific value of a field within the header, etc. At 1308, a determination is made that the packet is intended for the receiving base station (and not the wireless terminal that is communicatively coupled to the base station). Additionally, it is understood that the base station can "intercept" messages from subscriber-side devices and addressed to a communications peer within a network. In other words, base station may be employed to "intercept" downlink and/or uplink packets, where the term "intercept" refers to the base station receiving a packet addressed to a different network element and recognizing that such packet is intended for the base station. The base station can thereafter analyze contents of the data packet and, for instance, provide QoS treatment with respect to one or more traffic flows based upon contents of the data packet. The methodology 1300 then completes at 1310.

Figure 14:
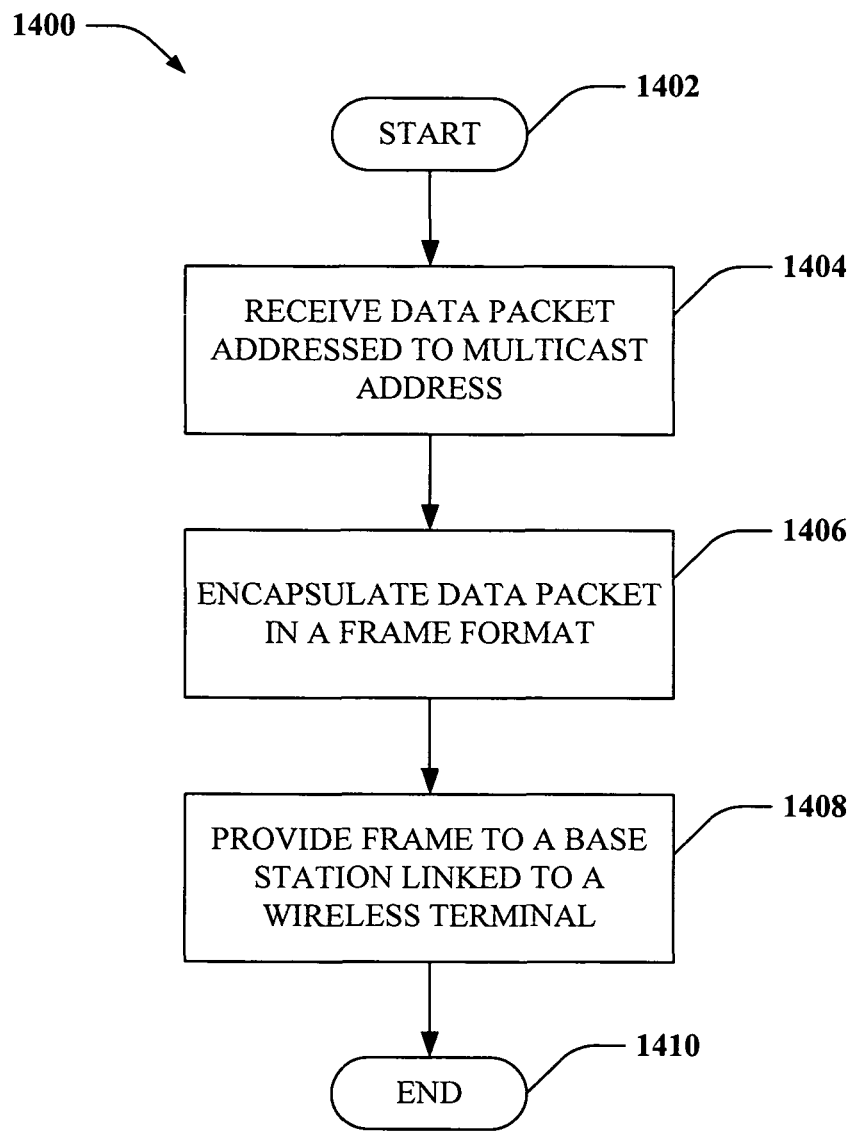
FIG. 14 is a representative flow diagram illustrating a methodology for performing one-hop multicasting.

Turning now to FIG. 14, a methodology 1400 for performing selective forwarding in connection with providing a data packet to an appropriate base station is illustrated. As described above, mobility of wireless terminals can cause primary points of attachment with respect to a wireless terminal. Moreover, a wireless terminal may be associated with links to multiple base stations, wherein one of such base stations should be designated as a primary point of attachment. It is difficult, however, to provide knowledge to each network entity and subscriber-side device of primary points of attachment as a mobile unit's geographic location alters. The methodology 1400 enables packets intended for a primary base station to be routed to such base station when an originating entity does not have knowledge of primary base station identity/network address.

The methodology 1400 starts at 1402, and at 1404 a data packet is received that is addressed to a one hop multicast address. For example, a host device can initiate transmission of the data packet and a wireless terminal associated with the host device can receive such data packet. At 1406, the data packet is encapsulated in a particular frame format (e.g., an LLC frame), and an indication is provided within the header of such frame that the data packet is intended for a primary point of attachment (base station). For instance, a wireless terminal can perform such encapsulation. At 1408, the frame is provided to a base station that is communicatively coupled to the wireless terminal. In more detail, the frame can be provided to a base station that is not the primary point of attachment, but such base station can analyze the frame and determine that the packet should be forwarded to an appropriate base station. In another example, the frame can be directly provided to the primary point of attachment. The methodology 1400 then completes at 1410.

Figure 15:
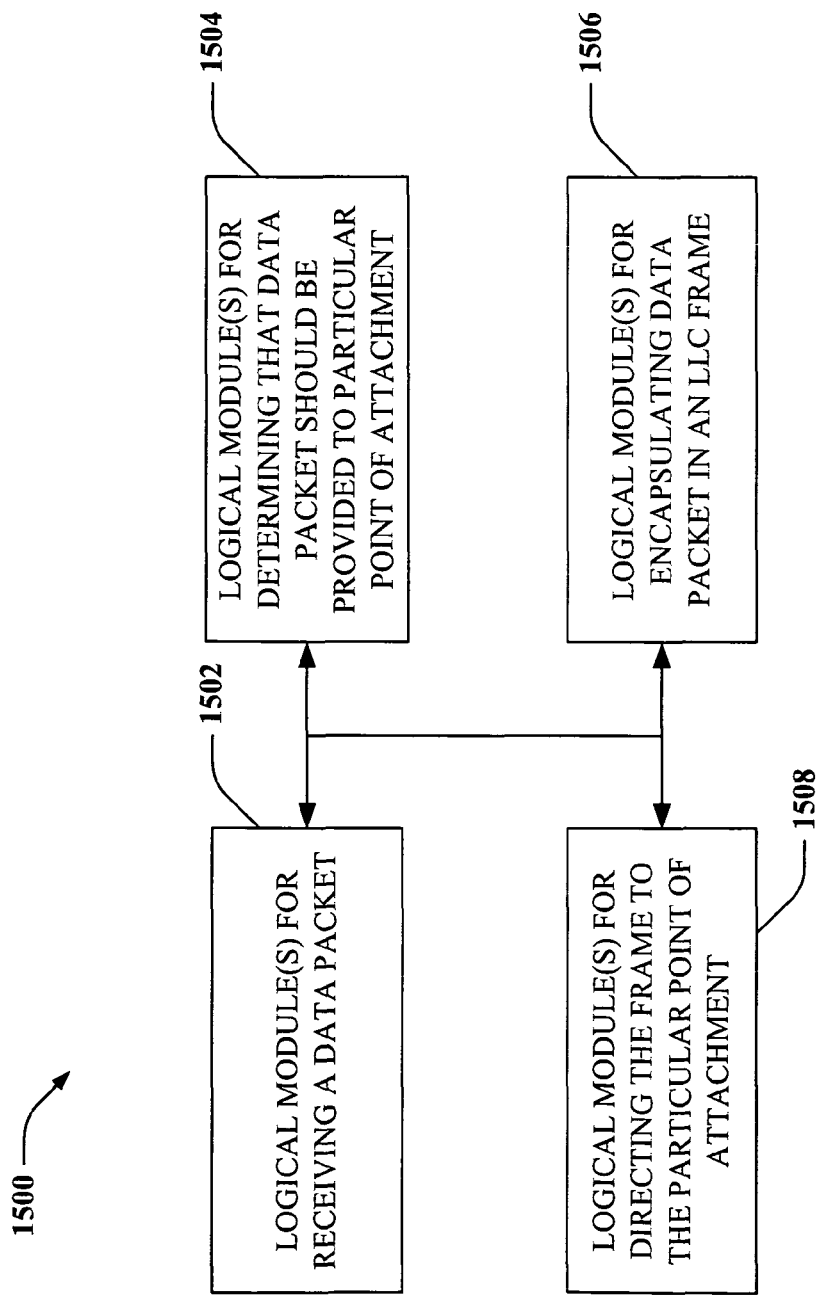
FIG. 15 is a block diagram of a system that facilitates routing of data packets in a packet-switched wireless communications network and signaling to an access node.

With reference to FIG. 15, a system 1500 that facilitates provision of data packets to an appropriate point of attachment (base station) is illustrated. System 1500 includes logical module(s) for receiving a data packet 1502, wherein such module(s) 1502 can include one or more network ports, an antenna, a receiver chain, memory, a processor, or any other suitable software/hardware that can be utilized to receive a data packet. System 1500 also includes logical module(s) for determining that the data packet should be provided to a particular point of attachment 1504. Such module(s) can include a processor, an application executed by the processor (e.g., configured to analyze the received data packet to determine whether the packet is intended for a primary point of attachment (base station)). System 1500 additionally includes logical module(s) for encapsulating the data packet in an LLC frame 1506. Again, such module(s) 1506 can include a processor, memory, hardware, software, firmware, etc. System 1500 also includes logical module(s) for directing the frame to the particular point of attachment 1508, wherein logical module(s) 1508 may include a transmitter, a network port, and/or any other suitable communications medium, as well as software, hardware, firmware, and the like that enables the frame to be directed to the particular point of attachment.

Figure 16:
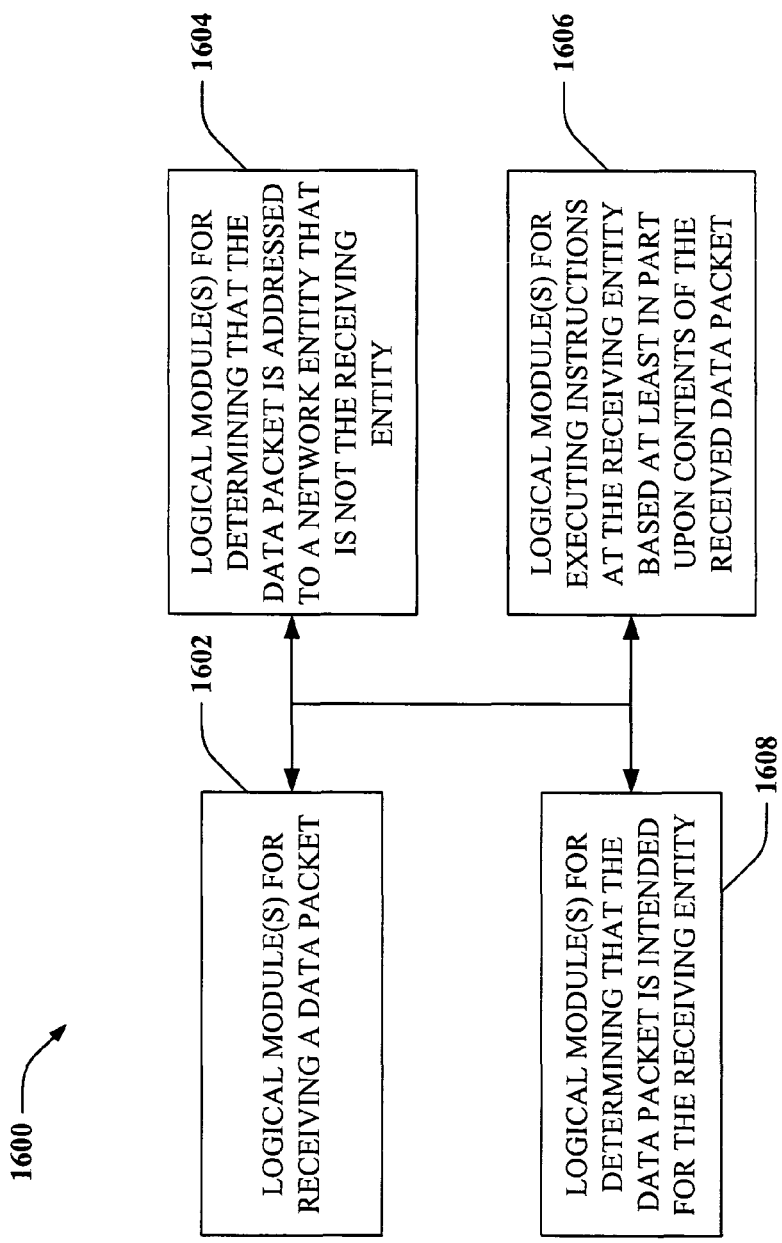
FIG. 16 is a block diagram of a system that facilitates routing of data packets in a packet-switched wireless communications environment.

Turning now to FIG. 16, a system 1600 relating to "intercepting" messages is illustrated, wherein "intercepting" refers to recognizing that a packet addressed to a network entity is in actuality intended for a receiving entity. System 1600 include logical module(s) for receiving a data packet 1602, wherein such module(s) 1602 can comprise an antenna, a receiver chain, a processor, memory, and/or any suitable hardware, software, and/or firmware associated therewith. The received data packet can be addressed to a particular network entity. System 1600 additionally includes logical module(s) for determining that the data packet is addressed to a network entity that is not the receiving entity 1604. For instance, the logical module(s) 1604 can include a processor, an application, and/or the like. System 1600 also includes logical module(s) 1606 for determining that the data packet is intended for the receiving entity 1606 (even though the data packet is addressed to a different network entity). The logical module(s) 1606 can include one or more processors, memory, etc. System 1600 can also comprise logical module(s) for executing instructions at the receiving entity based at least in part upon contents of the received data packet 1608. Such module(s) 1608 can include a processor, for example.

Figure 17:
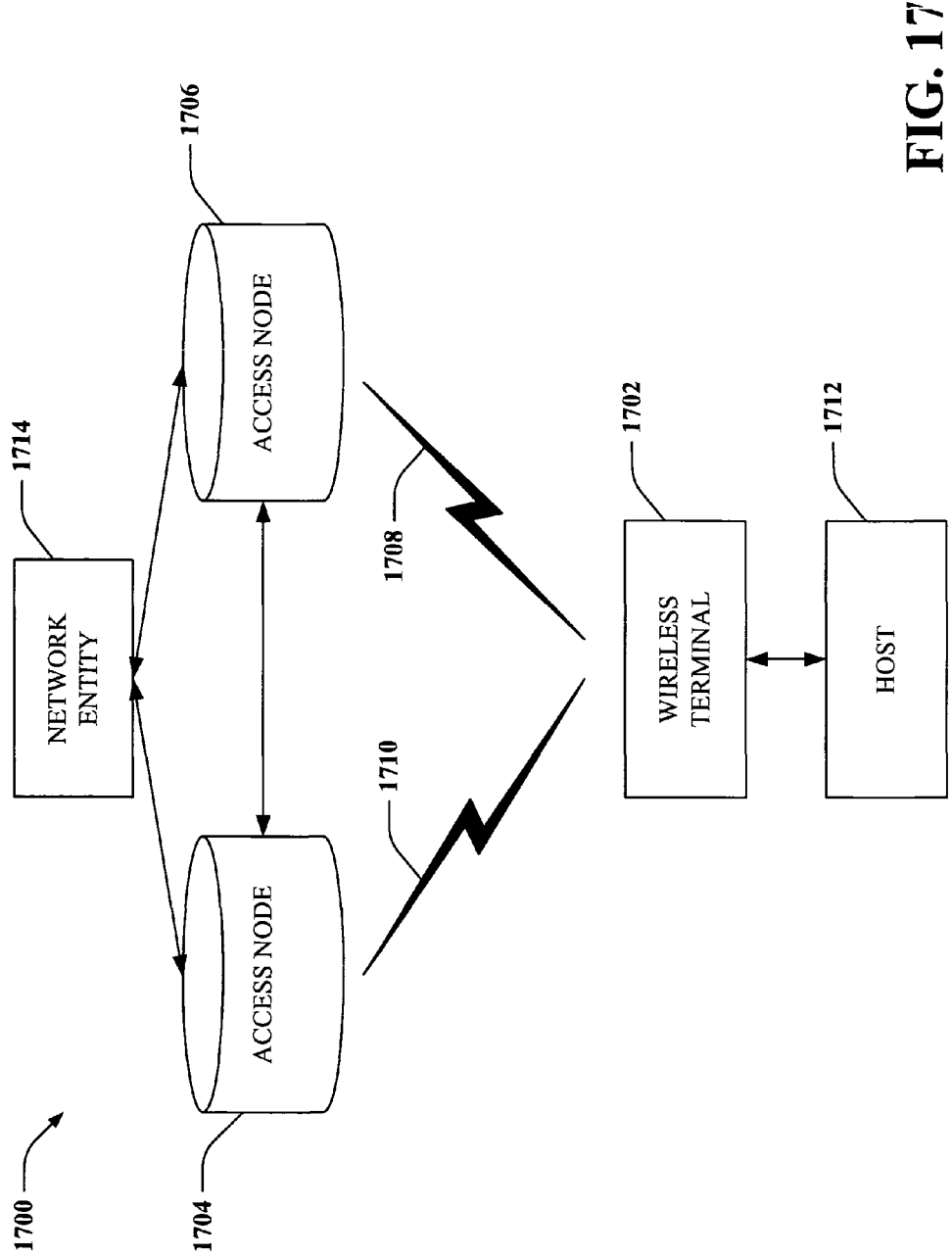
FIG. 17 is a block diagram provided herein to illustrate utilization of a move message in a wireless communications environment.

Now referring to FIG. 17, a system 1700 is shown, wherein system 1700 is employed to illustrate provision of an indication to a requester of resources that a point of attachment with respect to a resource state has been changed, e.g., the subscriber device with which resources are associated has moved to a new point of attachment. System 1700 includes a wireless terminal 1702 that is communicatively coupled to at least one of two access nodes 1704 and 1706. In an example, access nodes 1704 and 1706 can be base stations within a wireless communications environment, and wireless terminal 1702 can be communicatively coupled to both access nodes 1704 and 1706 simultaneously (as shown by links 1708 and 1710), wherein one of such nodes is a primary access node. It is understood, however, that wireless terminal 1702 can be coupled to both access nodes 1704 and 1706 simultaneously without either of such access nodes being labeled as a "primary"access node. In another example, wireless terminal 1702 may be linked to access node 1704 at a first instance in time and then handed off to access node 1706 at a second instance in time. Wireless terminal 1702 can be associated with a host device 1712, which, for instance, may comprise wireless terminal 1702. In another example, host 1712 may be a computing device and wireless terminal 1702 can be a peripheral device.

System 1700 can also include a network entity 1714 that requests resources from one of access nodes 1704 and 1706 with respect to wireless terminal 1702. For instance, network entity 1714 can be an application server, and can request QoS support/management on behalf of wireless terminal 1702 from a primary access node associated with wireless terminal. In another example, network entity 1714 can be a function that resides within an application server, for example. As described above, however, wireless terminal 1702 can move to different geographic locations within a network, thereby changing its point of attachment (or primary point of attachment) to a network. To ensure that network entity 1714 has knowledge of where to relay resource requests, a message (move message) that informs network entity 1714 that a point of attachment with respect to wireless terminal 1702 has changed is generated by at least one of access nodes 1704 and 1706 and provided to network entity 1714. In addition or alternatively, the message (move message) can inform network entity 1714 that resource state, e.g., data structures corresponding to QoS support for one or more traffic flows, controlled and/or maintained by the network entity 1714 have been moved to a new point of attachment of wireless terminal 1702.

Pursuant to an example, access node 1704 may at first be a point of attachment with respect to wireless terminal 1702, and network entity 1714 can provide access node 1704 with a request for resources. Access node 1704 can retain resource state information (e.g., QoS resource information) and provide wireless terminal 1702 with appropriate traffic flow treatment with respect to the resource request (assuming a subscriber is authorized with respect to requested resources). As wireless terminal 1702 changes location, a handoff may occur such that access node 1706 becomes the point of attachment (e.g., primary point of attachment) with respect to wireless terminal 1702. In another example, access node 1706 can become a point of attachment with respect to a particular resource or resource state while access node 1704 remains a point of attachment for different resources or resource states. Resource state information, including identity/network address of a requester, can be relayed between access node 1704 (a most recent point of attachment) to access node 1706 (a current point of attachment). Access node 1706 can then provide a message to network entity 1714 indicating that access node 1706 is now the point of attachment (e.g., the primary point of attachment) for wireless terminal 1702. In another embodiment, access node 1704 can provide the move message to network entity 1714, indicating that access node 1706 is the new point of attachment for wireless terminal 1702. In still another embodiment, both access node 1704 and access node 1706 can provide the network entity 1714 with a move message. Thereafter, network entity 1714 can provide subsequent resource requests to the current point of attachment (e.g., access node 1706).

Wireless terminal 1702 can also be employed to provide a move message, wherein such move message may be provided to host 1712. Pursuant to an example, wireless terminal 1702 may have knowledge that a point of attachment has changed (e.g., from access node 1704 to access node 1706). Wireless terminal 1702 can then generate a move message and provide such message to host 1712, thereby enabling host 1712 to have knowledge of where to provide resource requests (e.g., requests for QoS support for particular traffic flows).

As can be discerned, there may be a race condition if, for instance, network entity 1714 initiates a resource request and provides it to an access node that is no longer a primary access node and/or linked to wireless terminal 1702. In such case, resource requests (e.g., to add resources desirably associated with wireless terminal 1702, modify resources associated with wireless terminal 1702, delete resources associated with wireless terminal 1702) can time out. Prior to timing out or proximate in time thereto, network entity 1714 can receive a move message. Other manners/mechanisms for managing race conditions are contemplated by the inventors and are intended to fall under the scope of the hereto-appended claims.

Figure 18:
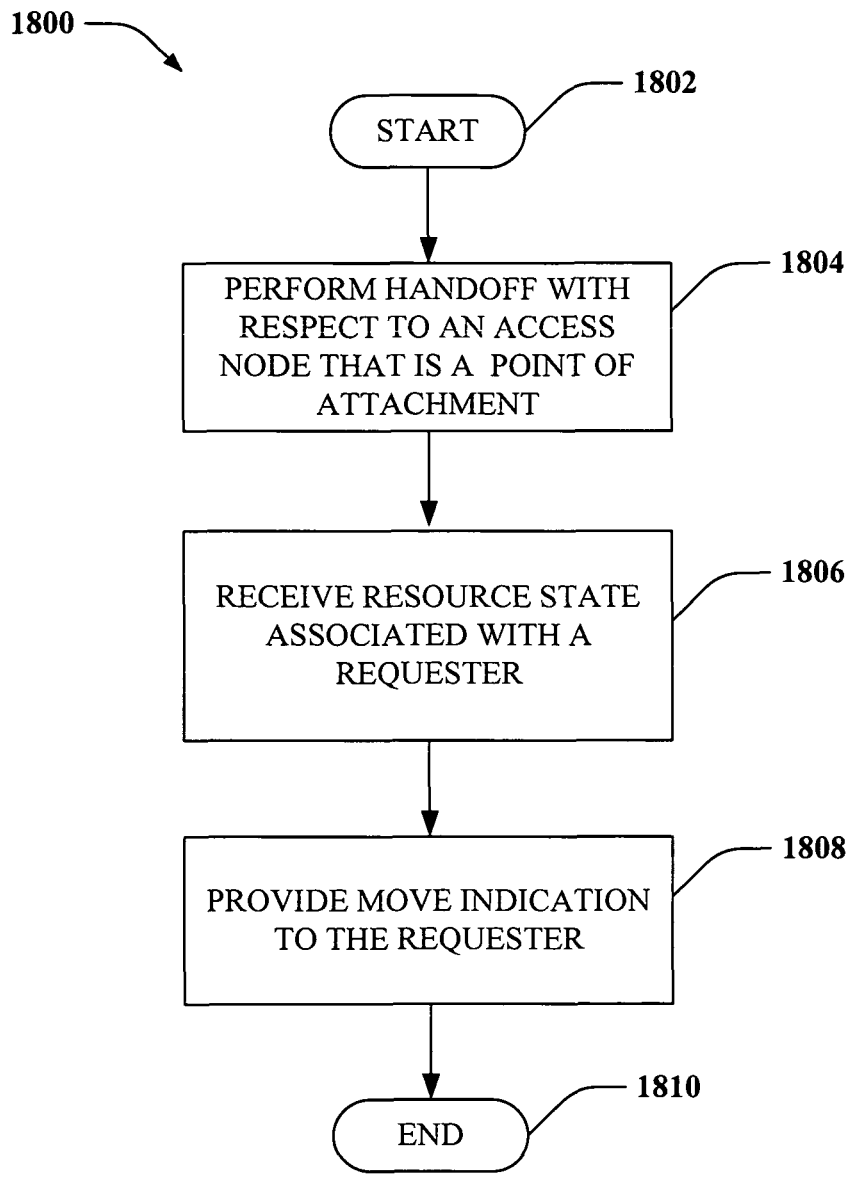
FIG. 18 is a representative flow diagram illustrating a methodology for creating a move message and providing it to a resource requester.

Turning now to FIG. 18, a methodology 1800 for providing a move indication (message) to a requester of resources is illustrated. Methodology 1800 begins at 1802, and at 1804 a handoff is performed with respect to an access node (e.g., base station) that is a point of attachment for a wireless terminal. For instance, the access node can be one of several points of attachment and/or can be a sole point of attachment (prior to handoff). Such handoff can occur due to a wireless terminal transitioning geographically between coverage areas provided by base stations, for instance. At 1806, a resource state associated with a resource requester is received. For example, such resource state can be received at a current point of attachment (e.g., primary point of attachment) from a most recent point of attachment (or primary point of attachment). The resource state, for instance, can indicate how particular traffic flows associated with a wireless terminal are to be treated with respect to QoS. The resource requester can be a network entity requesting resources associated with a wireless terminal, such as an application server.

Additionally or alternatively, the resource requester can be a host associated with the wireless terminal. Moreover, the resource requester can be a function that resides within an application server and/or a function that resides within a subscriber-side device. Still further, the current point of attachment can receive multiple resource states associated with a plurality of resource requesters. At 1808, a move indication is provided to the requester (or multiple requesters), thereby providing the requester(s) with knowledge of a base station that is providing certain QoS treatment with respect to one or more traffic flows to the wireless terminal, for instance. The requester can then provide subsequent requests to the current point of attachment. The methodology 1800 thereafter completes at 1810.

Figure 19:
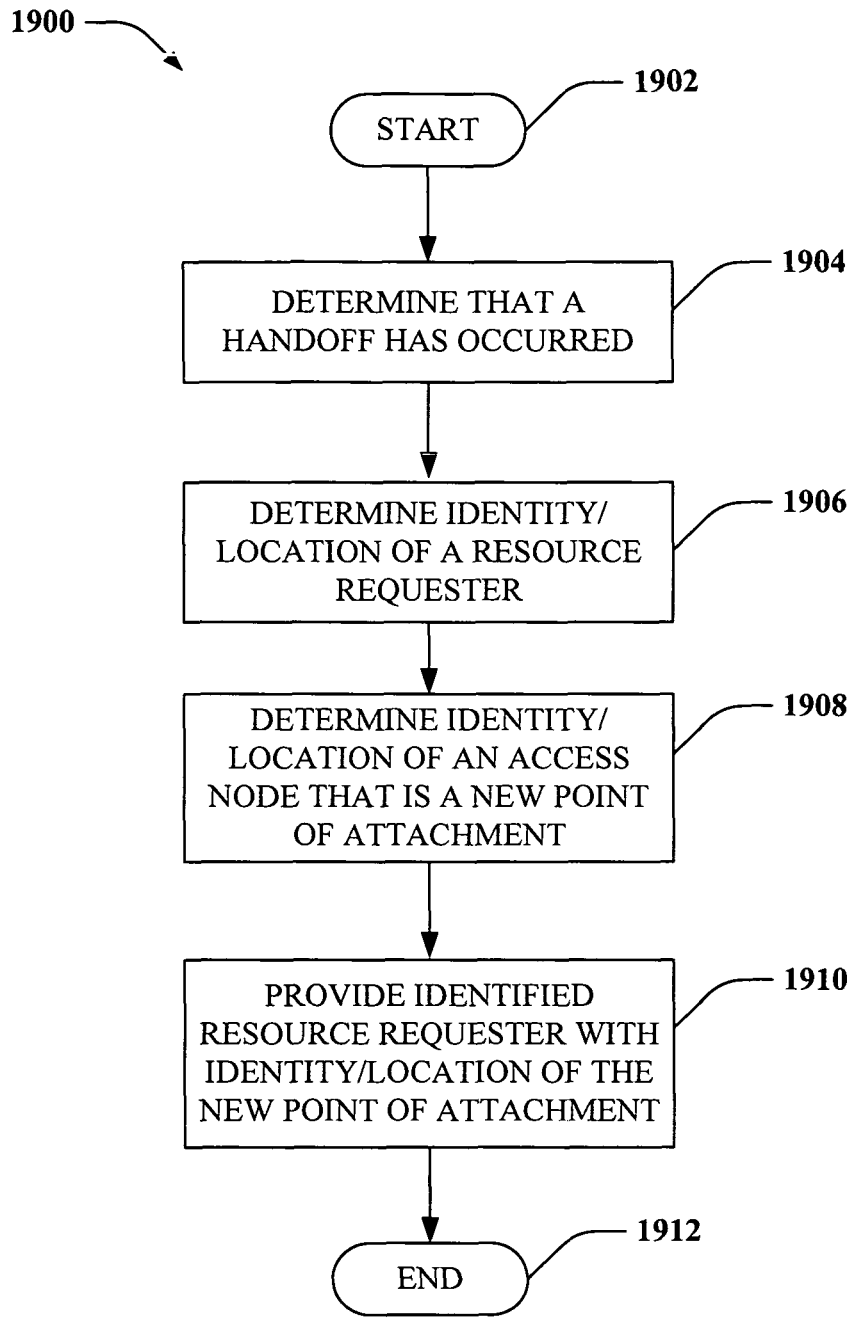
FIG. 19 is a representative flow diagram illustrating a methodology for creating a move message and providing it to a resource requester.

With respect to FIG. 19, a methodology 1900 for providing a resource requester with a move message is illustrated. Methodology 1900 begins at 1902, and at 1904 a determination is made that a handoff has occurred with respect to a wireless terminal. For example, an access node that was a point of attachment (e.g., a primary point of attachment) can determine that it is no longer a point of attachment (or no longer the primary point of attachment) after the handoff has occurred. At 1906, an identity/location of a resource requester is determined, wherein the access node managed/supported resources associated with the resource requester prior to the handoff. For instance, the identity and/or location of the resource requester can be retained within memory associated with the access node.

At 1908, an identity and/or location of an access node that is a new point of attachment (or new primary point of attachment) is determined. For example, such identity/location can be provided from an access node that is a new point of attachment (after handoff), from a wireless terminal that is subject to the handoff, and/or the like. At 1910, the identified resource requester is provided with an identity and/or location of the new point of attachment (or primary point of attachment). Thus, the resource requester will have knowledge of where to provide future resource requests. The methodology 1900 then completes at 1912.

Figure 20:
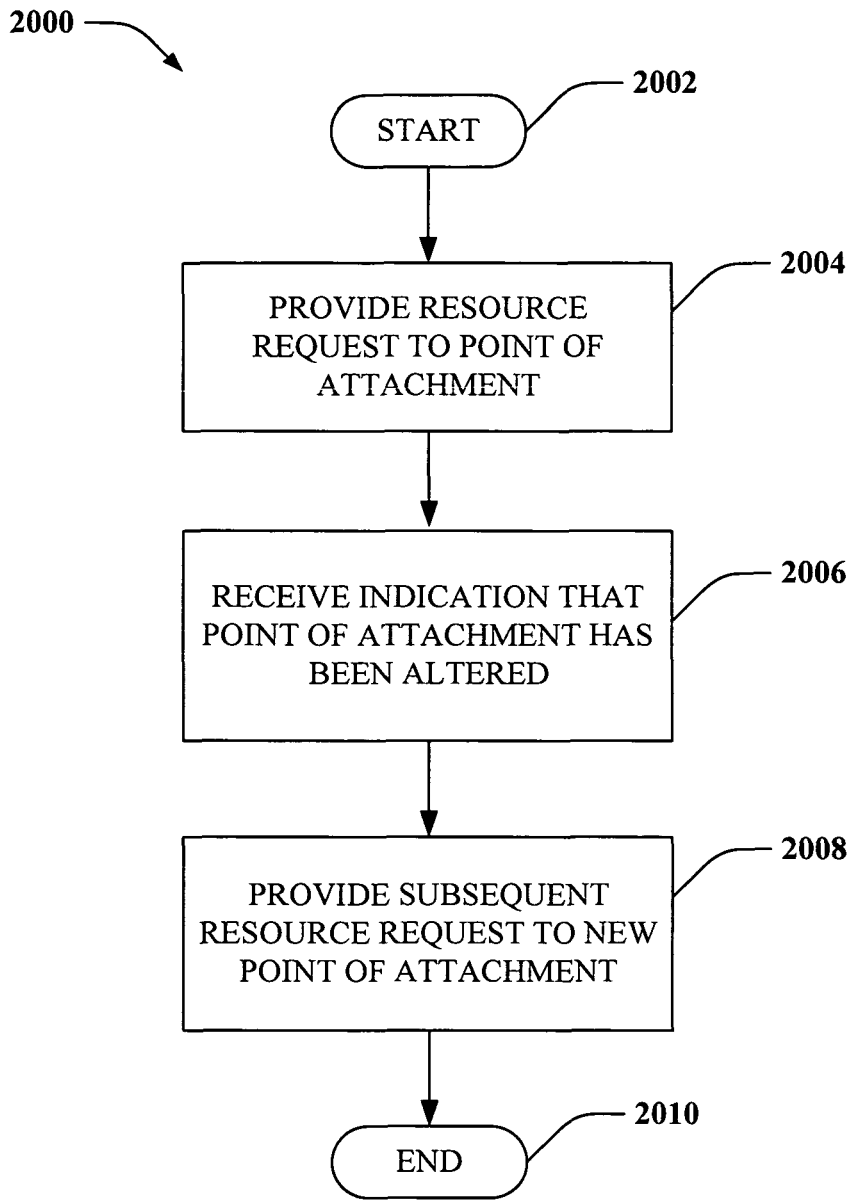
FIG. 20 is a representative flow diagram illustrating provision of resource requests to an appropriate point of attachment.

Referring now to FIG. 20, a methodology 2000 for providing resource requests to a point of attachment is illustrated. The methodology 2000 initiates at 2002, and at 2004 a request for resources on behalf of a wireless terminal is provided to a point of attachment, which can be, for example, a primary point of attachment. For instance, the request can be provided to a base station that performs scheduling, resource allocation, and other QoS functions with respect to the wireless terminal that is the subject of the request. An application server, for example, can provide the resource request to a current point of attachment. At 2006, an indication that a point of attachment has been altered is received (or that a primary point of attachment has changed). For example, as described above, the move message can be provided from a current primary point of attachment and/or the previous primary point of attachment. At 2008, a subsequent resource request is provided to the point of attachment (e.g., primary point of attachment) indicated within the move message, e.g., the new primary point of attachment following a change in the primary point of attachment. The methodology 2000 then completes at 2010.

Figure 21:
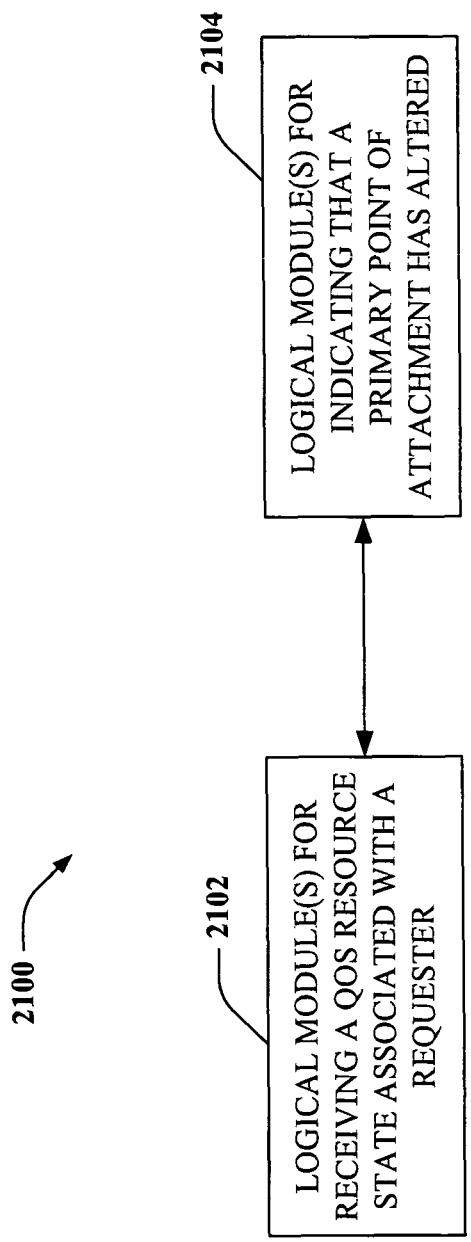
FIG. 21 is a block diagram of a system that facilitates creation and provision of a move message to a resource requester.

Now turning to FIG. 21, a system 2100 that facilitates informing a resource requester of a change in point of attachment with respect to a wireless terminal is illustrated. System 2100 includes logical module(s) for receiving a QoS resource state associated with a requester 2102, wherein such module(s) 2102 can include a port, a receiver chain, a processor, memory, and/or the like. For instance, module(s) 2102 can be configured to receive the resource state from a previous point of attachment or a previous primary point of attachment. With more specificity, during a handoff procedure, a previous point of attachment can provide a new point of attachment with resource states associated with a wireless terminal that is a subject of the handoff procedure. In another example, a previous primary point of attachment can provide a new primary point of attachment with resource states relating to the wireless terminal. System 2100 additionally includes logical module(s) for delivering a move indication to the requester 2104, wherein the module(s) 2104 can include an antenna, a transmitter chain, and/or the like. Thus, the requester will have knowledge of identity/network address of a current point of attachment associated with the wireless terminal.

Figure 22:
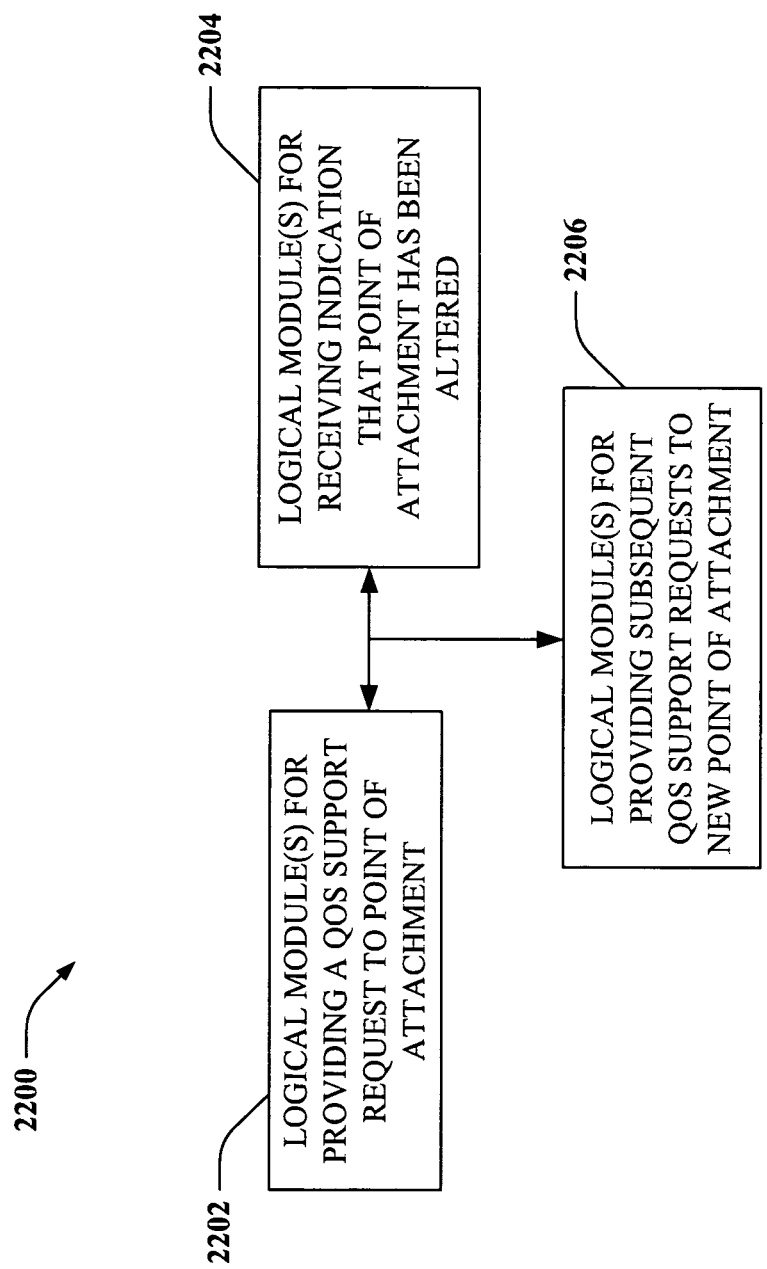
FIG. 22 is a block diagram of a system that facilitates provision of resource requests to an appropriate point of attachment.

With reference to FIG. 22, a system 2200 for providing QoS resource requests to an appropriate access node is illustrated. System 2200 includes logical module(s) for providing a QoS support request to a point of attachment 2202 (e.g., a primary point of attachment), wherein such module(s) 2202 can include an antenna, transmission software, network cabling, and/or the like. The point of attachment can be the point of attachment for a particular wireless terminal that is subject of the QoS support request. System 2200 additionally includes logical module(s) for receiving an indication that a point of attachment has been altered 2204. For example, the primary point of attachment may change, an additional point of attachment may be associated with the wireless terminal, etc. Such logical module(s) 2204 can include a receiver chain, network cabling, software that enables receipt of the indication, etc. System 2200 further includes logical module(s) for providing subsequent QoS support requests to a new point of attachment with respect to the wireless terminal 2206. The logical module(s) 2206 can include substantially similar elements as logical module(s) 2202.

Figure 23:
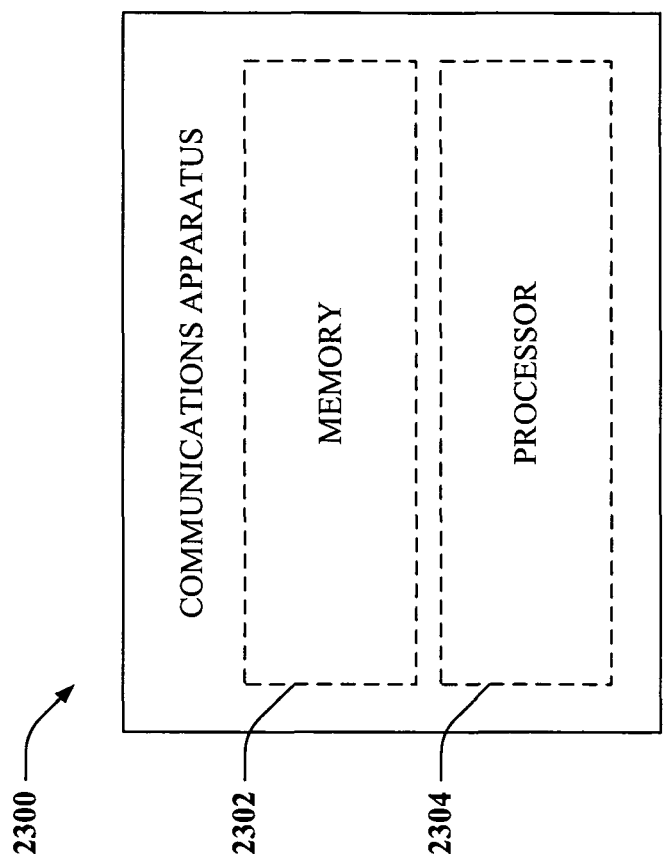
FIG. 23 illustrates a communications apparatus.

Now turning to FIG. 23, a communications apparatus 2300 is illustrated. Communications apparatus can be a terminal, a wireless terminal, a host, an access node (such as a base station), a network entity such as an application server, a home agent, etc., and/or the like. Communications apparatus 2300 can include memory 2302 that is utilized to retain various instructions and a processor 2304 that is configured to execute such instructions. For instance, if communications apparatus 2300 is an access node, memory 2302 can include instructions for receiving QoS support/management requests from multiple entities on behalf of a wireless terminal, and processor 2304 can be employed to execute such instructions. Generally, communications apparatus can be configured such that memory 2302 includes instructions relating to any suitable functionality described above, and processor 2304 can be employed to execute such instructions (including but not limited to instructions for providing QoS support requests, instructions for receiving QoS support requests, instructions for generating and delivering a move indication, instructions for encapsulating a data package in an LLC frame, and other functionality described herein).

Figure 24:
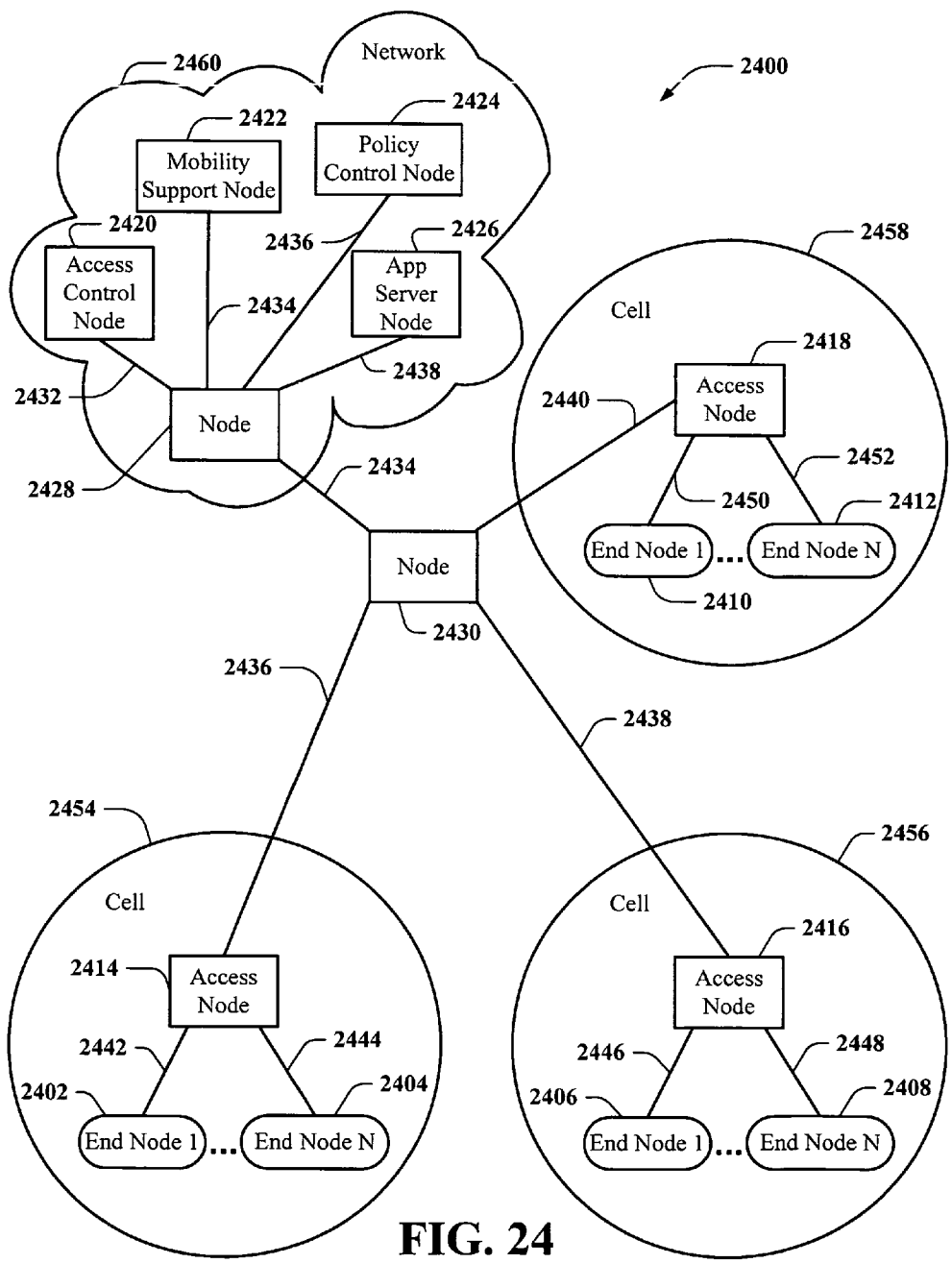
FIG. 24 illustrates an example network.

To provide additional context for one or more embodiments described herein, FIG. 24 is provided to illustrate an example communication system 2400 that comprises a plurality of nodes interconnected by communications links. The system 2400 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 2400 exchange information using signals, e.g., messages, based on communication protocols, e.g., the Internet Protocol (IP). The communications links of the system 2400 may be implemented, for example, using wires, fiber optic cables, and/or wireless communications techniques. The system 2400 includes a plurality of end nodes 2402-2412, which access the communication system 2400 by way of a plurality of access nodes 2414-2418. End nodes 2402-2412 may be, e.g., wireless communication devices or terminals, and the access nodes 2414-2418 may be, e.g., wireless access routers or base stations. Communication system 2400 also includes a number of other nodes 2420-2430 that are used to provide interconnectivity or to provide specific services or functions.

Communications system 2400 depicts a network 2460 that includes access control node 2420, mobility support node 2422, policy control node 2424, and application server node 2426, all of which are connected to an intermediate network node 2428 by a corresponding network link 2432-2438, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 2422, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 2424, e.g., a policy server or Policy Decision Point (PDP), supports policy authorization for services or application layer sessions. In some embodiments, application server node 2426, e.g., a Session Initiation Protocol server, streaming media server, or other application layer server, supports session signaling for services available to end nodes and/or provides services or content available to end nodes.

Intermediate network node 2428 in network 2460 provides interconnectivity to network nodes that are external from the perspective of network 2460 by way of network link 2434. Network link 2434 is connected to intermediate network node 2430, which provides further connectivity to access nodes 2414, 2416, and 2418 by way of network links 2436-2440, respectively. Each access node 2414-2418 is depicted as providing connectivity to end nodes 2402-2412, respectively, by way of corresponding access links 2442-2452, respectively. In communication system 2400, each access node 2414-2418 is depicted as using wireless technology, e.g., wireless access links, to provide access. Wired technology may also be utilized, however, in connection with provision of access. A radio coverage area, e.g., communications cells 2454-2458 of each access node 2414-2418, is illustrated as a circle surrounding the corresponding access node.

Communication system 2400 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 2400. Additionally, some of the functional entities depicted in communication system 2400 may be omitted or combined. Location or placement of these functional entities may also be varied.

Figure 25:
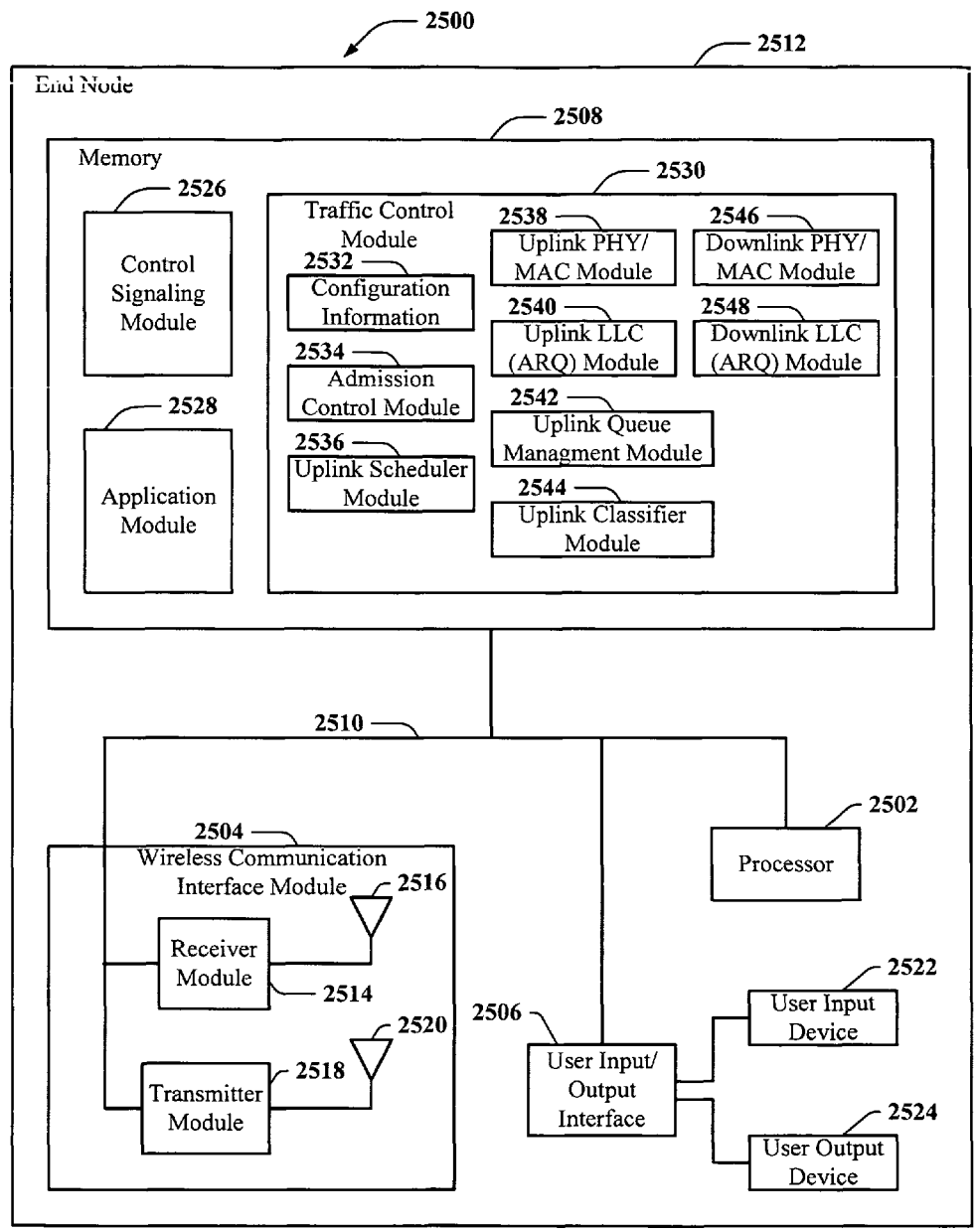
FIG. 25 illustrates an example end node.

FIG. 25 provides an illustration of an example end node 2500, e.g., wireless terminal. End node 2500 is a representation of an apparatus that may be used as any one of end nodes 2402-2412 (FIG. 24). End node 2500 includes a processor 2502, a wireless communication interface module 2504, a user input/output interface 2506 and memory 2508 coupled together by a bus 2510. Accordingly, by way of bus 2510, the various components of the end node 2500 can exchange information, signals and data. Components 2502-2508 of end node 2500 can be located inside a housing 2512.

Wireless communication interface module 2504 provides a mechanism by which the internal components of end node 2500 can send and receive signals to/from external devices and network nodes, e.g., access nodes. Wireless communication interface module 2504 includes, e.g., a receiver module 2514 with a corresponding receiving antenna 2516 and a transmitter module 2518 with a corresponding transmitting antenna 2520 used for coupling end node 2500 to other network nodes, e.g., by way of wireless communications channels.

End node 2500 also includes a user input device 2522, e.g., keypad, and a user output device 2524, e.g., display, which are coupled to bus 2510 through user input/output interface 2506. Thus, user input/output devices 2522 and 2524 can exchange information, signals and data with other components of end node 2500 by way of user input/output interface 2506 and bus 2510. User input/output interface 2506 and associated devices 2522 and 2524 provide mechanisms by which a user can operate end node 2500 to accomplish various tasks. In particular, user input device 2522 and user output device 2524 provide functionality that allows a user to control end node 2500 and applications, e.g., modules, programs, routines and/or functions, that execute in memory 2508 of end node 2500.

Processor 2502, under control of various modules, e.g., routines, included in memory 2508 controls operation of end node 2500 to perform various signaling and processing. The modules included in memory 2508 are executed on startup or as called by other modules. Modules may exchange data, information, and signals when executed. Modules may also share data and information when executed. Memory 2508 of end node 2500 includes a control signaling module 2526, an application module 2528, and a traffic control module 2530, which further includes configuration information 2532 and various additional modules.

Control signaling module 2526 controls processing relating to receiving and sending signals, e.g., messages, for controlling operation and/or configuration of various aspects of end node 2500 including, e.g., traffic control module 2530 as well as configuration information 2532 and various additional modules included. In some embodiments, control signaling module 2526 can include state information, e.g., parameters, status and/or other information, relating to operation of end node 2500 and/or one or more signaling protocols supported by control signaling module 2526. In particular, control signaling module 2526 may include configuration information, e.g., end node identification information and/or parameter settings, and operational information, e.g., information about current processing state, status of pending message transactions, etc.

Application module 2528 controls processing and communications relating to one or more applications supported by end node 2500. In some embodiments, application module 2528 processing can include tasks relating to input/output of information by way of the user input/output interface 2506, manipulation of information associated with an application, and/or receiving or sending signals, e.g., messages, associated with an application. In some embodiments, application module 2528 includes state information, e.g., parameters, status and/or other information, relating to operation of one or more applications supported by application module 2528. In particular, application module 2528 may include configuration information, e.g., user identification information and/or parameter settings, and operational information, e.g., information about current processing state, status of pending responses, etc. Applications supported by application module 2528 include, e.g., Voice over IP (VoIP), web browsing, streaming audio/video, instant messaging, file sharing, gaming, etc.

Traffic control module 2530 controls processing relating to receiving and sending data information, e.g. messages, packets, and/or frames, through wireless communication interface module 2504. The example traffic control module 2530 includes configuration information 2532 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 2530 follows.

An admission control module 2534 maintains information relating to resource utilization/availability and determines if sufficient resources are available to support QoS parameters desirably associated with particular traffic flows. Resource availability information maintained by admission control module 2534 includes, e.g., packet and/or frame queuing capacity, scheduling capacity, as well as processing and memory capacity needed to support one or more traffic flows. Control signaling module 2526, application module 2528, and/or other modules included in end node 2500 may query admission control module 2534 to determine if sufficient resources are available to support a new or modified traffic flow, where the admission control determination is a function of QoS parameters of the particular traffic flow and QoS parameters defined within a profile. Configuration information 2532 can include configuration information, e.g., parameters settings, that affect the operation of admission control module 2534, e.g., an admission control threshold value that indicates percentage of resource that may be allocated prior to rejecting additional requests.

An uplink scheduler module 2536 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 2504, e.g., from end node 2500 to an access node. Uplink scheduler module 2536 can schedule transmissions and allocate transmission resources as a function of QoS parameters associated with one or more traffic flows. In some embodiments, scheduling and/or resource allocation operations performed by uplink scheduler module 2536 are additionally a function of channel conditions and other factors, e.g., power budget.

An uplink PHY/MAC module 2538 controls physical (PHY) layer and Media Access Control (MAC) layer processing relating to sending data information, e.g., messages, packets, and/or frames, by way of wireless communication interface module 2504, e.g., from end node 2500 to an access node. For instance, operation of uplink PHY/MAC module 2538 includes both sending and receiving control information, e.g., signals or messages, to coordinate sending of data information, e.g., messages, packets, and/or frames. Configuration information 2532 can include configuration information, e.g., parameters settings, that affect the operation of uplink PHY/MAC module 2538, e.g., a frequency, band, channel, spreading code or hoping code to be used for transmissions, an identifier associated with end node 2500, a request dictionary prescribing use of an assignment request channel, etc.

An uplink LLC (ARQ) module 2540 controls Logical Link Control (LLC) layer processing relating to sending data information, e.g., messages, packets, and/or frames, through wireless communication interface module 2504, e.g., from end node 2500 to an access node. Uplink LLC (ARQ) module 2540 includes processing associated with Automatic Repeat Request (ARQ) capabilities, e.g., retransmission of lost packets or frames. Uplink LLC (ARQ) module 2540 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 2540 can additionally perform fragmentation of higher layer messages, e.g., packets, into multiple sub-portions, e.g., frames to be sent by uplink PHY/MAC module 2540. Configuration information 2532 can include configuration information that affect operation of uplink LLC (ARQ) module 2540, e.g., an ARQ window size, maximum number of retransmissions, a discard timer, etc.

An uplink queue management module 2542 maintains information and controls processing relating to storage of data information to be sent by way of wireless communication interface module 2504, e.g., from end node 2500 to an access node. Uplink queue management module 2542 can, for example, control storage of data information awaiting transmission and maintain state information regarding data information awaiting transmission on a per traffic flow basis, e.g., packets associated with each traffic flow may be stored in separate queues. For instance, uplink queue management module 2542 supports a variety of queue management techniques and/or capabilities, e.g., head drop, tail drop, as well as various Active Queue Management (AQM) mechanisms such as Random Early Detection (RED). Configuration information 2532 can include configuration information that affects operation of uplink queue management module 2542, such as a queue limit, drop strategy, and/or AQM thresholds associated with one or more traffic flows.

An uplink classifier module 2544 controls processing relating to identification of data information as belonging to particular traffic flows prior to being sent by way of the wireless communication interface module 2504, e.g., from end node 2500 to an access node. In some embodiments, messages, packets, and/or frames to be sent through utilization of wireless communication interface module 2504 are classified as belonging to one of a variety of traffic flows by uplink classifier module 2544 based on inspection of one or more header and/or payload fields. Results of classification by uplink classifier module 2544 can affect the treatment of classified data information by uplink queue management module 2542 as well as other modules within memory 2508. For example, the results may determine a particular queue the message, packet, and/or frame will be associated with for storage and further affect subsequent processing such as scheduling. Configuration information can include configuration information that affect operation of uplink classifier module 2544, e.g., a set of one or more classifier filter rules that prescribe criteria used to associate data information, e.g., messages, packets, and/or frames, as belonging to one or more traffic flows.

A downlink PHY/MAC module 2546 controls PHY layer and MAC layer processing relating to receiving data information by way of wireless communication interface module 2504. Operation of downlink PHY/MAC module 2546 can include both sending and receiving control information to coordinate receiving of data information. Configuration information 2504 can include configuration information that affect operation of downlink PHY/MAC module 2546, e.g., a frequency, band, channel, spreading code or hoping code to be used for reception, an identifier associated with end node 2500, etc.

A downlink LLC (ARQ) module 2548 controls LLC layer processing relating to receiving data information by way of wireless communication interface module 2504. Downlink LLC (ARQ) module 2548 includes processing associated with ARQ capabilities, e.g., retransmission of lost packets or frames. For example, downlink LLC (ARQ) module 2548 can further included processing relating to an LLC header and/or trailer that encapsulates higher layer messages, which provides additional functionality, e.g., multi-protocol multiplexing/demultiplexing through a type field or error detection by way of a checksum field. Downlink LLC (ARQ) module 2548 can also perform reassembly of frames received by the downlink PHY/MAC module 2546 into higher layer messages. Configuration information 2532 can, and in some embodiments does, include configuration information, e.g., parameters settings, that affect operation of downlink LLC (ARQ) module 2548, e.g., an ARQ window size, maximum number of retransmissions, a discard timer, etc.

Figure 26:
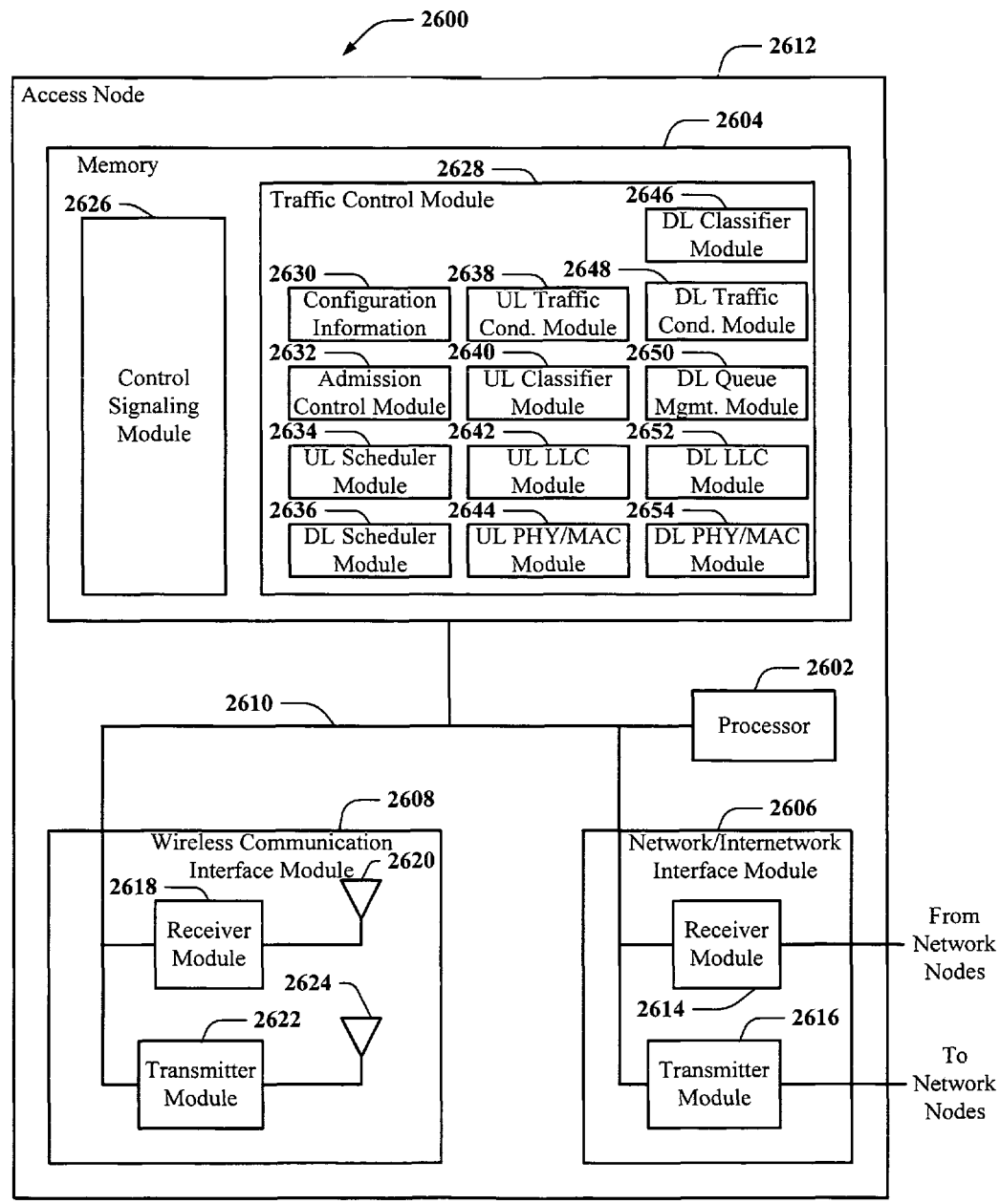
FIG. 26 illustrates an example access node.

FIG. 26 provides a detailed illustration of an example access node 2600 implemented in accordance with the present invention. The access node 2600 is a detailed representation of an apparatus that may be used as any one of the access nodes 2414-2418 depicted in FIG. 24. In the FIG. 26 embodiment, access node 2600 includes a processor 2602, memory 2604, a network/internetwork interface module 2606 and a wireless communication interface module 2608, coupled together by bus 2610. Accordingly, by way of bus 2610 the various components of access node 2600 can exchange information, signals and data. The components 2602-2610 of access node 2600 are located inside a housing 2612.

Network/internetwork interface module 2606 provides a mechanism by which the internal components of access node 2600 can send and receive signals to/from external devices and network nodes. Network/internetwork interface module 2606 includes a receiver module 2614 and a transmitter module 2616 used for coupling node 2600 to other network nodes, e.g., through copper wires or fiber optic lines. Wireless communication interface module 2608 also provides a mechanism by which the internal components of access node 2600 can send and receive signals to/from external devices and network nodes, e.g., end nodes. Wireless communication interface module 2608 includes, e.g., a receiver module 2618 with a corresponding receiving antenna 2620 and a transmitter module 2622 with a corresponding transmitting antenna 2624. Wireless communication interface module 2608 is used for coupling access node 2600 to other nodes, e.g., by way of wireless communication channels.

Processor 2602 under control of various modules, e.g., routines, included in memory 2604 controls operation of access node 2600 to perform various signaling and processing. The modules included in memory 2604 are executed on startup or as called by other modules. Modules may exchange data, information, and signals when executed. Modules may also share data and information when executed. In the FIG. 26 embodiment, memory 2604 of access node 2600 includes a control signaling module 2626 and a traffic control module 2628, which further includes configuration information 2630 and various additional modules 2632-2654.

Control signaling module 2626 controls processing relating to receiving and sending signals, e.g., messages, for controlling operation and/or configuration of various aspects of access node 2600 including e.g., traffic control module 2628 as well as configuration information 2630 and the various additional modules included therein 2632-2654. For instance, control signaling module 2626 includes state information, e.g., parameters, status and/or other information, relating to operation of access node 2600 and/or one or more signaling protocols supported by control signaling module 2626. In particular, control signaling module 2626 may include configuration information, e.g., access node identification information and/or parameter settings, and operational information, e.g., information about current processing state, status of pending message transactions, etc.

Traffic control module 2628 controls processing relating to receiving and sending data information, e.g., messages, packets, and/or frames, by way of wireless communication interface module 2608. For instance, traffic control module can include configuration information 2630 as well as various additional modules 2632-2654 that control various aspects of quality of service for packets and/or traffic flows, e.g., associated sequences of packets. In some embodiments, traffic control module 2628 includes state information, e.g., parameters, status and/or other information, relating to operation of access node 2600, traffic control module 2628, and/or one or more of the various additional modules included therein 2632-2654. Configuration information 2630, e.g., parameter settings, determines, affects and/or prescribes operation of traffic control module 2628 and/or the various additional modules included therein 2632-2654. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 2628 follows.

Admission control module 2632 maintains information relating to resource utilization/availability and determines if sufficient resources are available to support quality of service requirements of particular traffic flows. Resource availability information maintained by admission control module 2632 includes, e.g., packet and/or frame queuing capacity, scheduling capacity, as well as processing and memory capacity needed to support one or more traffic flows. Control signaling module 2626 and/or other modules included in access node 2600 can query admission control module 2632 to determine if sufficient resources are available to support a new or modified traffic flow, where the admission control determination is a function of the quality of service requirements of the particular traffic flow and/or the available resources. Configuration information 2630 can include configuration information, e.g., parameters settings, that affect the operation of admission control module 2632, e.g., an admission control threshold value that indicates the percentage of resource that may be allocated prior to rejecting additional requests.

Uplink scheduler module 2634 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 2608. Uplink scheduler module 2634 can schedule transmissions and allocate transmission resources as a function of the quality of service requirements and/or constraints associated with one or more traffic flows and/or one or more end nodes. Configuration information 2630 can include configuration information that affect the operation of uplink scheduler module 2634, e.g., a priority, rate bound, latency bound, and/or sharing weight associated with one or more traffic flows and/or end nodes. In some embodiments, scheduling and/or resource allocation operations performed by uplink scheduler module 2634 are additionally a function of channel conditions and other factors, e.g., power budget.

Downlink scheduler module 2636 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 2600 to one or more end nodes through wireless interface module 2608. Downlink scheduler module 2636 can schedule transmissions and allocate transmission resources as a function of the quality or service requirements and/or constraints associated with one or more traffic flows and/or one or more end nodes. Configuration information 2630 can include configuration information that affects the operation of downlink scheduler module 2636, e.g., a priority, rate bound, latency bound, and/or sharing weight associated with one or more traffic flows and/or end nodes. In some embodiments, scheduling and/or resource allocation operations performed by the downlink scheduler module 2636 are additionally a function of channel conditions and other factors, e.g., power budget.

Uplink traffic conditioner module 2638 controls processing relating to traffic conditioning, e.g., metering, marking, policing, etc., for data information, e.g., messages, packets, and/or frames, received by way of wireless interface module 2608, e.g., from an end node to access node 2600. Uplink traffic conditioner module 2638 can condition traffic, e.g., meter, mark and/or police, as a function of the quality of service requirements and/or constraints associated with one or more traffic flows and/or one or more end nodes. Configuration information 2630 can include configuration information that affects the operation of uplink traffic conditioner module 2638, e.g., a rate bound, and/or marking value associated with one or more traffic flows and/or end nodes.

Uplink classifier module 2640 controls processing relating to identification of data information, e.g., messages, packets, and/or frames, received through wireless interface module 2608, e.g., from an end node to access node 2600, as belonging to particular traffic flows prior to being processed by uplink traffic conditioner module 2638. In some embodiments, messages, packets, and/or frames received through wireless communication interface module 2608 are classified as belonging to one of a variety of traffic flows by uplink classifier module 2640 based on inspection of one or more header and/or payload fields. The results of classification by uplink classifier module 2640 can affect the treatment of the classified data information, e.g., messages, packets, and/or frames, by uplink traffic conditioner module 2638, e.g., the results may determine a particular data structure or state machine the message, packet, and/or frame will be associated with and further affect subsequent processing such as metering, marking, and/or policing. Configuration information 2630 can include configuration information that affects the operation of uplink classifier module 2640, e.g., a set of one or more classifier filter rules that prescribe criteria used to associate data information, e.g., messages, packets, and/or frames, as belonging to one or more traffic flows.

Uplink LLC (ARQ) module 2642 controls LLC layer processing relating to receiving data information, e.g., packets and/or frames, by way of wireless communication interface module 2608, e.g., from an end node to access node 2600.

Uplink LLC (ARQ) module 2642 includes processing associated with ARQ capabilities, e.g., retransmission of lost packets or frames. In some embodiments, uplink LLC (ARQ) module 2642 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 2642 can also perform reassembly of frames received by uplink PHY/MAC module 2644 into higher layer messages, e.g., packets. The configuration information 2630 can include configuration information that affects the operation of uplink LLC (ARQ) module 2642, e.g., an ARQ window size, maximum number of retransmissions, a discard timer, etc.

Uplink PHY/MAC module 2644 controls PHY layer and MAC layer processing relating to receiving data information, e.g., packets and/or frames, by way of wireless communication interface module 2608, e.g., from an end node to access node 2600. In some embodiments, operation of uplink PHY/MAC module 2644 includes both sending and receiving control information, e.g., signals or messages, to coordinate receiving of data information, e.g., messages, packets, or frames. Configuration information 2630 can include configuration information that affects the operation of uplink PHY/MAC module 2644, e.g., a frequency, band, channel, spreading code or hopping code to be used for reception, an identifier associated with access node 2600, etc.

Downlink classifier module 2646 controls processing relating to identification of data information, e.g., messages, packets, and/or frames, as belonging to particular traffic flows prior to being sent through wireless communication interface module 2608, e.g., from access node 2600 to an end node. In some embodiments, messages, packets, and/or frames to be sent by way of wireless communication interface module 2608 are classified as belonging to one of a variety of traffic flows by downlink classifier module 2646 based on inspection of one or more header and/or payload fields. The results of classification by downlink classifier module 2646 can affect the treatment of the classified data information, e.g., messages, packets, and/or frames, by downlink queue management module 2650 and other modules 2648, 2652, and 2654, e.g., the results may determine a particular queue the message, packet, and/or frame will be associated with for storage and further affect subsequent processing such as scheduling. Configuration information 2630 can include configuration information, e.g., parameters settings, that affect the operation of downlink classifier module 2646, e.g., a set of one or more classifier filter rules that prescribe criteria used to associate data information, e.g., messages, packets, and/or frames, as belonging to one or more traffic flows.

Downlink traffic conditioner module 2648 controls processing relating to traffic conditioning, e.g., metering, marking, policing, etc., for data information, e.g., messages, packets, and/or frames, to be sent by way of wireless interface module 2608, e.g., from access node 2600 to an end node. Downlink traffic conditioner module 2648 can condition traffic, e.g., meter, mark and/or police, as a function of the quality of service requirements and/or constraints associated with one or more traffic flows and/or one or more end nodes. Configuration information 2630 can include configuration information that affects the operation of downlink traffic conditioner module 2648, e.g., a rate bound, and/or marking value associated with one or more traffic flows and/or end nodes.

Downlink queue management module 2650 maintains information and controls processing relating to storage of data information, e.g., messages, packets, and/or frames, to be sent by way of wireless communication interface module 2608, e.g., from access node 2600 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 2650 supports a variety of queue management techniques and/or capabilities, e.g., head drop, tail drop, as well as various AQM mechanisms such as RED. Configuration information 2630 can include configuration information that affects the operation of downlink queue management module 2650, e.g., a queue limit, drop strategy, and/or AQM thresholds associated with one or more traffic flows.

Downlink LLC (ARQ) module 2652 controls LLC layer processing relating to sending data information, e.g., messages, packets, and/or frames, by way of wireless communication interface module 260, e.g., from access node 2600 to an end node. Downlink LLC (ARQ) module 2652 includes processing associated with ARQ capabilities, e.g., retransmission of lost packets or frames. In some embodiments, downlink LLC (ARQ) module 2652 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 2652 can also perform fragmentation of higher layer messages, e.g. packets, into multiple sub-portions, e.g., frames to be sent by downlink PHY/MAC module 2654. Configuration information 2630 can include configuration information that affects the operation of downlink LLC (ARQ) module 2652, e.g., an ARQ window size, maximum number of retransmissions, a discard timer, etc.

Downlink PHY/MAC module 2654 controls PHY layer and MAC layer processing relating to sending data information, e.g., messages, packets, and/or frames, by way of wireless communication interface module 2608, e.g., from access node 2600 to an end node. In some embodiments, operation of downlink PHY/MAC module 2654 includes both sending and receiving control information, e.g., signals or messages, to coordinate sending of data information, e.g., messages, packets, or frames. Configuration information 2630 can include configuration information that affects the operation of downlink PHY/MAC module 2654, e.g., a frequency, band, channel, spreading code or hoping code to be used for transmissions, an identifier associated with the access node 2600, etc.

Figure 27:
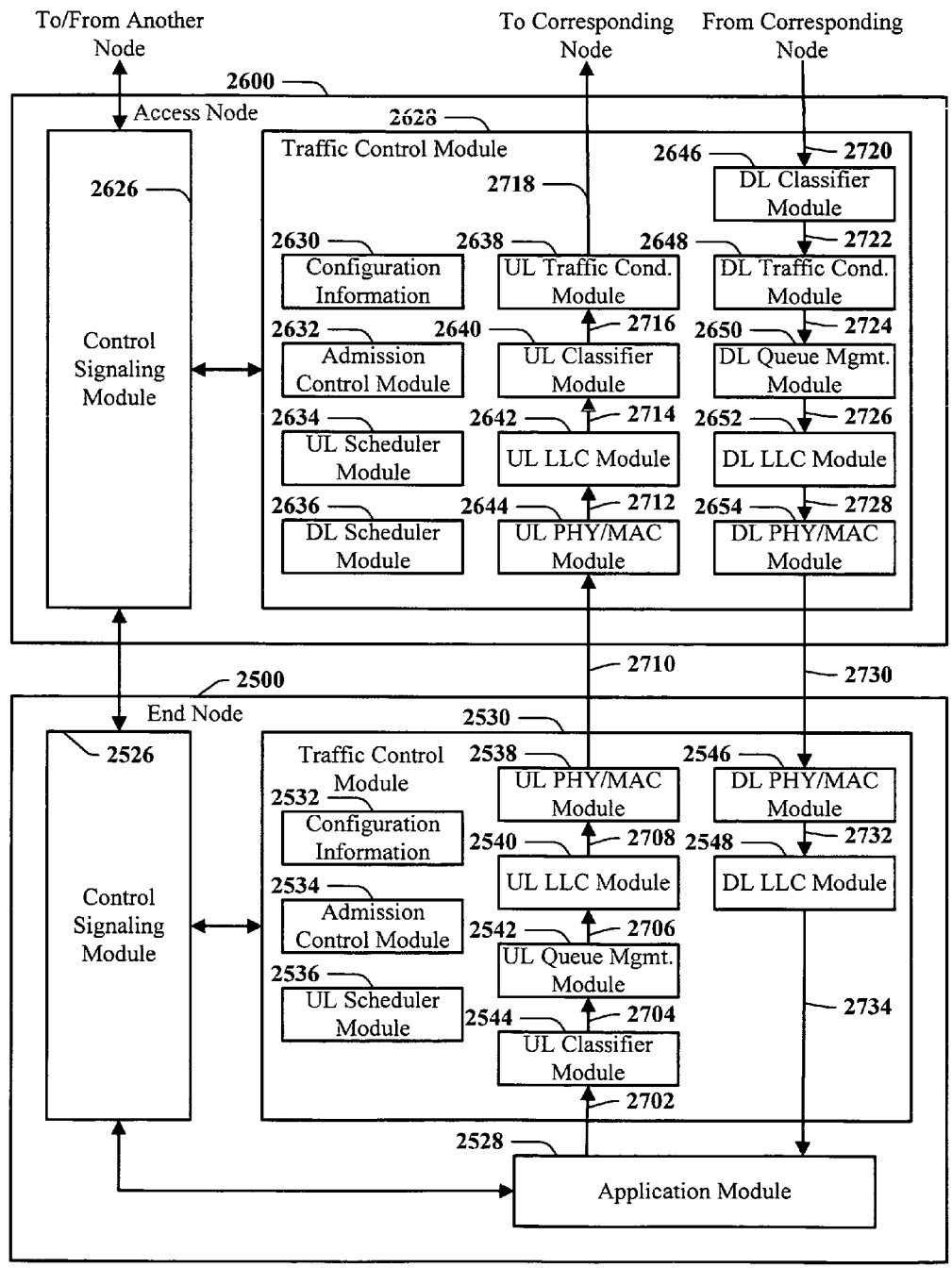
FIG. 27 illustrates an example end node in communication with an example access node.

FIG. 27 illustrates example signaling and traffic flows between various modules included in example end node 2500 and example access node 2600. The FIG. 27 end node 2500 and FIG. 27 access node 2600 are simplified representations of the FIG. 25 end node 2500 and FIG. 26 access node 2600, respectively. The FIG. 27 example shows application module 2528 sending and receiving data information, e.g., traffic flows comprising a sequence of messages, packets, or frames. In the context of the FIG. 24 example system, the FIG. 27 end node 2500 may be any one of end nodes 2402-2412 depicted in FIG. 24 and the application module 2528 included in the FIG. 27 end node 2500 may be exchanging data information with another node in the system, e.g., another end node 2402-2412 or the application server node 2426 as depicted in FIG. 24. In FIG. 27 and the subsequent description, the node with which the FIG. 27 end node 2500 is exchanging data information is referred to as the The data information, e.g., traffic flows comprising a sequence of messages, packets, or frames, sent from the application module 2528 in the end node 2500 to a corresponding node is shown by a sequence of arrows 2702-2708 to proceed through a sequence of modules 2538-2544 included in end node 2500 for processing, after which the data information is sent from the end node 2500 to the access node 2600, e.g., by way of wireless communication interface module 2504. Following reception by access node 2600, e.g., by way of wireless communication interface module 2608, the data information, e.g., traffic flows comprising a sequence of messages, packets, or frames, sent from the application module 2528 in end node 2500 to the corresponding node is shown by a sequence of arrows 2710-2718 to proceed through a sequence of modules 2638-2644 included in access node 2600 for processing, prior to being forwarded from the access node 2600 toward the corresponding node, e.g., directed in accordance with routing information to an intermediate node connected to the access node by way of network/internetwork interface module 2606.

The data information, e.g., traffic flows comprising a sequence of messages, packets, or frames, sent from a corresponding node to application module 2528 in end node 2528 is shown by a sequence of arrows 2720-2728 to be received by access node 2600, e.g., by way of network/internetwork interface module 2606, and then to proceed through a sequence of modules 2646-2654 included in access node 2600 for processing, after which the data information is sent from the access node 2600 to the end node 2500, e.g., via the wireless communication interface module 2608. Following reception by end node 2500, e.g., by way of wireless communication interface module 2504, the data information, e.g., traffic flows comprising a sequence of messages, packets, or frames, sent from the corresponding node to application module 2528 in end node 2500 is shown by a sequence of arrows 2730-2734 to proceed through a sequence of modules 2546 and 2548 included in end node 2500 for processing, prior to being delivered to the application module 2528 in end node 2500.

In addition to the exchange of data information, e.g., traffic flows, FIG. 27. also depicts the exchange of control information, e.g., signaling flows and/or communication interfaces. In particular, the FIG. 27 example depicts the exchange of control information between control signaling module 2626 and traffic control module 2628 included in access node 2600. Similarly, the FIG. 27 example depicts the exchange of control information between control signaling module 2526 and the traffic control module 2530 included in the end node 2500. In both access node 2600 and end node 2500, exchange of control information between the modules as shown allows the respective control signaling module 2626/2526 in the access/end node 2600/2500 to affect, e.g., set, modify, and/or monitor, the configuration and/or operation of the various modules included in the respective traffic control module 2628/2530, as needed to provide the proper quality of service treatment of the data information, e.g., traffic flows, to/from the application module 2528 in the end node 2500.

The exchange of control information, e.g., signaling flows and/or communication interfaces, is also shown a) between another node and control signaling module 2626 in access node 2600, b) between application module 2528 in end node 2500 and control signaling module 2526 in end node 2500, and c) between the respective control signaling modules 2626/2526 in access node 2600 and end node 2500. These exchanges of control information, e.g., signaling flows and/or communication interfaces, enable the configuration and/or operation of traffic control modules 2628/2530 in both access node 2600 and the end node 2500 to be affected by a) one or more additional nodes, e.g. the access control node 2420 and/or application server node 2426, b) application module 2528 in end node 2500, or c) a combination of one or more additional nodes and the application module 2528 in end node 2500. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for routing in a cellular communications environment, comprising:
   receiving a data packet of a given type;
   if the given type corresponds to a first type, selecting a point of attachment from amongst a plurality of available points of attachment for a wireless terminal in the cellular communications environment based on link qualities associated with the plurality of available points of attachment;
   if the given type corresponds to a second type, selecting a particular point of attachment from amongst the plurality of available points of attachment that is used for routing data packets of the second type irrespective of the link qualities;
   encapsulating the data packet in a logical link control frame; and
   indicating that the logical link control frame should be directed towards the selected point of attachment.

2. The method of claim 1, wherein the particular point of attachment is selected as the selected point of attachment by analyzing the data packet and determining that the data packet is directed to a one-hop multicast address.

3. The method of claim 1, wherein the particular point of attachment is a primary point of attachment amongst the plurality of available points of attachment with respect to the wireless terminal.

4. The method of claim 1, further comprising providing an indication of an identity of the selected point of attachment within a header of the logical link control frame.

5. A wireless terminal configured to perform the method of claim 1.

6. A wireless terminal configured to perform the method of claim 2.

7. A wireless terminal configured to perform the method of claim 3.

8. A wireless terminal configured to perform the method of claim 4.

9. The method of claim 1, wherein the data packet is generated by a host device.

10. A wireless communications device, comprising:
    means for receiving a data packet of a given type;
    means for selecting a point of attachment from amongst a plurality of available points of attachment based on link qualities associated with the plurality of available points of attachment if the given type corresponds to a first type, and for selecting a particular point of attachment from amongst the plurality of available points of attachment that is used for routing data packets of the second type irrespective of the link qualities if the given type corresponds to a second type;
    means for encapsulating the data packet in a logical link control frame; and
    means for indicating that the logical link control frame should be directed towards the selected point of attachment.

11. The wireless communications device of claim 10, wherein the wireless communication device is a mobile terminal.

12. The wireless communications device of claim 10, further comprising means for analyzing the data packet and determining that the data packet is directed to a one-hop multicast address.

13. A processor configured to execute the following instructions:
    receiving a data packet of a given type in a cellular communications environment;
    if the given type corresponds to a first type, selecting a point of attachment from amongst a plurality of available points of attachment for a wireless terminal in the cellular communications environment based on link qualities associated with the plurality of available points of attachment;
    if the given type corresponds to a second type, selecting a particular point of attachment from amongst the plurality of available points of attachment that is used for routing data packets of the second type irrespective of the link qualities;
    encapsulating the data packet in a logical link control frame; and
    indicating that the logical link control frame should be directed towards the selected point of attachment.

14. The processor of claim 13 further configured to execute the following instructions:
    determining that the data packet is addressed to a one-hop multicast address; and
    directing the logical link control frame towards the particular point of attachment as the selected point of attachment based upon the determination that the data packet is addressed to the one-hop multicast address.

15. A non-transitory machine-readable medium having stored thereon machine-executable instructions for:
    receiving a data packet of a given type in a cellular network;
    if the given type corresponds to a first type, selecting a point of attachment from amongst a plurality of available points of attachment for a given wireless terminal in the cellular communications environment based on link qualities associated with the plurality of available points of attachment;
    if the given type corresponds to a second type, selecting a particular point of attachment from amongst the plurality of available points of attachment that is used for routing data packets of the second type irrespective of the link qualities;
    encapsulating the data packet in a logical link control frame; and indicating that the logical link control frame should be directed towards the selected point of attachment.

16. A wireless terminal comprising the non-transitory machine-readable medium of claim 15.

17. The non-transitory machine-readable medium of claim 15 having stored thereon further instructions for analyzing the data packet and determining that the data packet is directed to a one-hop multicast address.

18. A wireless communications apparatus comprising:
a memory that retains instructions for:
receiving a data packet of a given type in a cellular network;
if the given type corresponds to a first type, selecting a point of attachment from amongst a plurality of available points of attachment for the wireless communications apparatus in the cellular communications environment based on link qualities associated with the plurality of available points of attachment;
if the given type corresponds to a second type, selecting a particular point of attachment from amongst the plurality of available points of attachment that is used for routing data packets of the second type irrespective of the link qualities;
encapsulating a received data packet in a logical link control frame, wherein the received data packet is associated with a cellular communications network; and
indicating that the logical link control frame should be directed towards the selected point of attachment; and
a processor that executes the instructions.

19. The wireless communications device of claim 10, wherein the first type includes one or more data packet types other than connection request messages and/or Quality of Service (QoS) request messages.

20. The wireless communications device of claim 10, wherein the link qualities include signal-to-noise ratios and/or loading levels of the plurality of available points of attachment.

21. The wireless communications device of claim 10, wherein the second type includes connection request messages and/or Quality of Service (QoS) request messages.

* * * * *